(12) United States Patent
Sakamaki et al.

(10) Patent No.: US 6,747,631 B1
(45) Date of Patent: Jun. 8, 2004

(54) INFORMATION PERCEPTION APPARATUS, INFORMATION TRANSMISSION SYSTEM, AND MEMORY MEDIUM IN WHICH PROGRAM FOR CONTROLLING INFORMATION PERCEPTION APPARATUS IS STORED

(75) Inventors: Katsumi Sakamaki, Nakai-machi (JP); Kazuyuki Tsukamoto, Nakai-machi (JP); Koichiro Okamura, Nakai-machi (JP)

(73) Assignee: Fuji Xerox Co. Ltd., Tokyo (JP)

( * ) Notice: Subject to any disclaimer, the term of this patent is extended or adjusted under 35 U.S.C. 154(b) by 0 days.

(21) Appl. No.: 09/520,440

(22) Filed: Mar. 7, 2000

(30) Foreign Application Priority Data

Mar. 17, 1999  (JP) ............................. 11-072515
Sep. 24, 1999  (JP) ............................. 11-270220

(51) Int. Cl.$^7$ .................................. G09G 5/08
(52) U.S. Cl. .................... 345/157; 345/161; 345/702
(58) Field of Search .................. 345/156, 157, 345/159, 160, 161, 163, 167, 173, 700, 701, 702

(56) References Cited

U.S. PATENT DOCUMENTS

| | | | |
|---|---|---|---|
| 5,186,629 A | * | 2/1993 | Rohen |
| 5,563,629 A | * | 10/1996 | Caprara |
| 5,625,576 A | | 4/1997 | Massie et al. |
| 5,825,308 A | * | 10/1998 | Rosenbert |
| 6,020,876 A | * | 2/2000 | Rosenberg et al. |
| 6,271,834 B1 | * | 8/2001 | May et al. |
| 6,310,606 B1 | * | 10/2001 | Armstrong |
| 6,400,352 B1 | * | 6/2002 | Bruneau et al. |

FOREIGN PATENT DOCUMENTS

| | | |
|---|---|---|
| JP | A-59-198483 | 11/1984 |
| JP | A-2-5081 | 1/1990 |
| JP | U-5-96863 | 12/1993 |
| JP | A-5-333765 | 12/1993 |
| JP | A-7-191798 | 7/1995 |

OTHER PUBLICATIONS

*FEELitMOUSE*, Immersion Corporation Technical Document, www.force-feedback.coom/feelit, pp. 1–10, Jun. 1999.

* cited by examiner

Primary Examiner—Regina Liang
(74) Attorney, Agent, or Firm—Oliff & Berridge, PLC

(57) ABSTRACT

The invention provides a tactile information transmission system or an information perception apparatus that transmits information by means of various motions of a presenter in two directions, as well as a small driving force generation apparatus that drives a presenter suitably. Thin plate-like magnets are provided on a base, and generate magnetic fields perpendicularly. A perception unit is supported above the magnets movably in the horizontal direction. Plural coils are fixed on the perception unit, some coils are provided so as to cross in X direction and the residual coils are provided so as to cross in Y direction. By controlling supplied current or applied voltage, the perception unit is driven arbitrarily in an XY plane. A user places a finger on the perception unit, recognizes the motion of the perception unit, and obtains information. The motion signal for driving the perception unit can be supplied from another information processing apparatus, and the perception unit is moved in correlation with the image information displayed on a display.

23 Claims, 23 Drawing Sheets

A-A

INFORMATION PERCEPTION APPARATUS, INFORMATION TRANSMISSION SYSTEM, AND MEMORY MEDIUM IN WHICH PROGRAM FOR CONTROLLING INFORMATION PERCEPTION APPARATUS IS STORED

BACKGROUND OF THE INVENTION

1. Field of the Invention

This invention relates to a tactile information transmission system for transmission of various information through tactile sensation of human fingers and a tactile information perception apparatus, and more particularly relates to a system for information transmission by means of perception of the motion of a part on which a human hand finger touches and a driving power generation apparatus suitably used for such system or apparatus.

2. Description of the Related Art

In many cases, the tactile sensation is the decisive sensation for recognizing or judging an object among perception information perceived by sense organs such as eyes, ears, nose, hands, and fingers. It is likely that a person understands and is convinced of the feeling such as surface smoothness and roughness or weight of an object by touching it with hands and fingers and makes various decisions after such perception.

On the other hand, the information of commodities or exhibitions, which cannot be obtained by touching with hands and fingers, displayed on a screen of a television set or a personal computer, or the information of commodities introduced on documents such as journals, pamphlets, or catalogues, cannot be perceived through atmosphere and perception though the object can be recognized in word or visually. A person fills the lack of information by estimation and stores the estimation in the brain and is convinced of it.

Therefore, the depth of understanding based on the visual single information is apt to be shallower than that based on the information with tactile sensation, as the result the erroneous judgment is caused due to the vague memory.

However, the development and spread of information communication apparatus have been addressed mainly on visual information so far such as Internet, and the information transmission based on visual sensation and auditory sensation, which has been popular so far, has made great progress. Therefore, after full development and spread of visual information transmission apparatuses, it is expected that the demand for tactile information transmission will grow.

As the information transmission tool based on the tactile sensation, Braille has been known for long years for use by visually handicapped persons. Semi-three dimensional resin documents made by press-molding originated from a mold as tools for transmission or recognition of diagrammatic configurational information such as maps have been known.

Furthermore, the transmission of such character information or configurational information by means of an electronic information apparatus has been tried, and some examples are disclosed in Japanese Published Unexamined Patent Application No. Sho 59-168483, Japanese Published Unexamined Patent Application No. Hei 2-5081, Japanese Published Unexamined Patent Application No. Hei 5-333765, Japanese Published Unexamined Utility Model Application No. Hei 5-96863, U.S. Pat. No. 5,625,576, etc.

Apparatuses disclosed in Japanese Published Unexamined Patent Application No. Sho 59-198483, Japanese Published Unexamined Patent Application No. Hei 2-5081, and Japanese Published Unexamined Patent Application No. Hei 5-333765 are the ones for displaying Braille, plural pins are activated and controlled so that some pins are projected and some pins are recessed to thereby generate the Braille cord.

The apparatus disclosed in Japanese Published Unexamined Utility Model Application No. Hei 5-96863 functions as a three-dimensional display, plural pins arranged in a matrix format are driven individually in the vertical direction by a driving source, and the position in the height direction is controlled. Therefore, characters or diagrams are displayed three-dimensionally by means of a set of plural pins.

The apparatus disclosed in U.S. Pat. No. 5,625,576 has the structure for presenting tactile information to a fingertip, is provided with a robot manipulator having a link mechanism, and is provided with a fingerstall at the tip of the manipulator into which a finger is to be inserted. An operator inserts a finger into the fingerstall, and moves the finger with viewing a pointer that appears on a computer screen to thereby perceive the configuration and soft-hard feeling of an object on the screen.

On the other hand, an input apparatus by which a user can perceive an object by means of correlation between a displayed image and vibration that is perceived by a hand and fingers has been known (product of Sony Co., brand name is DUALSHOCK). The apparatus generates various sensation by selecting the vibration frequency and interval.

An apparatus that drives a mouse by providing the electromagnetic force from a mouse pad instead of a mouse for selecting an image by use of pointer displayed on a display (the technique name is FEELitMOUSE, product of Immersion Co.). The mass feeling of a displayed image at the portion where a pointer is overlapped with moving of a mouse, and vibration corresponding to the roughness of the imaginary object such as a button or window are transmitted to a user through tactile sensation. Though the detailed structure of this apparatus has not been disclosed, it is estimated that a dedicated mouse is placed on a dedicated mouse pad having a built-in processor for performing arithmetic operation corresponding to tactile sensation, and the mouse is moved by means of an electromagnetic mechanism.

Japanese Published Unexamined Patent Application No. Hei 7-191798 discloses an apparatus that feeds back tactile information to an input user by rotational control of a sphere provided in an input apparatus.

The apparatus gives tactile sensation as if a finger is sliding on an object of a certain configuration or as if a certain object is moving by a method in which a ball is in contact with fingers or a hand of a user and the ball is driven rotationally.

However, these conventional apparatus described hereinabove are disadvantageous as described hereunder.

The apparatus disclosed in Japanese Published Unexamined Patent Application No. Sho 59-198483, Japanese Published Unexamined Patent Application No. Hei 2-5081, and Japanese Published Unexamined Patent Application No. Hei 5-333465 must express the information in the form of Braille code information because the apparatus only has binary expression capability namely projected pins and recessed pins. Therefore all the information is transmitted through language, and configuration such as analogue contour lines or movement captured sensuously cannot be expressed.

The apparatus disclosed in Japanese Published Unexamined Patent Application No. Hei 5-96863 has the structure for controlling many pin positions and is capable of expressing three-dimensional configuration, but is not capable of dynamic expression because the apparatus is structured on the premise that the apparatus is used in static state.

Many pins are moved independently in the apparatus, and it is required to control pins individually, such a mechanism requires complex structure and complex control.

The apparatus disclosed in U.S. Pat. No. 5,625,576 gives the touching force sensation information on one fingertip and is capable of giving sensation of configuration and hard/soft feeling. An operator moves his wrist or arm by himself and perceives a reaction force on the extension of the movement. In other words, the hand searches around the information in a virtual space, and the operator cannot acquire the information unless the operator moves actively.

The apparatus has the structure that converts the rotational motion of electromagnetic motors provided in many directions to obtain the driving force in the plural directions to the swing rotation of plural swing arms, and such structure requires a large volume for containing the driving mechanism for motion in plural directions. The distance from the motor, which is the driving source, to the arm tip where an operator perceives is too long in the structure and the force is transmitted by way of many connection members, as the result it is difficult to transmit weak vibration or slight displacement. Though the apparatus can express rough configurational contours or hard/soft feeling, it is difficult to perceive slight motion of frequency.

On the other hand, to provides the information that is perceivable through tactile sensation as described hereinabove, it is required to operate presenters based on the electronic information in many cases. A well-known driving source such as solenoid may be used as the driving source that drives a presenter, but to miniaturize the apparatus and to render the apparatus capable of providing the information freely and dynamically, the apparatus that is miniaturized and easily controllable is desirable. In the case of the conventional driving apparatus in which the presenters are operated in two direction as in the case of the present invention, driving apparatuses are provided in the two directions and the presenter is moved in a plane by means of motion of these apparatuses.

In the case of the apparatus that reproduces the tactile sensation by means of changing frequency and amplitude of vibration, the reproduction of slight tactile sensation is difficult because the vibration wave is non-directional simple vibration, and only the same stimulation as that perceivable by hand, arm, or whole body is obtained.

In the case of the apparatus that moves a mouse by means of electromagnetic force, though the apparatus is suitable to express the tactile sensation that is perceivable on the whole hand and whole palm, a palm cannot discriminate slight tactile sensation and it is required to move a mouse significantly to obtain only slight tactile sensation. The pointing device including the mouse is advantageous in that a pointer moves a long distance on a display correspondingly to a small motion of a mouse, the pointing device is an excellent device for efficient input work. However, in the case of the mouse used in the abovementioned system, it is required to move a whole mouse in order to provide the tactile sensation and the small input motion is sacrificed. It is required that a mouse is used on a dedicated mouse pad, and the limitation on the use is problematic.

Furthermore, in the case of the apparatus in which a sphere is rotated and tactile sensation is fed back to a user, the finger face portion that is being in contact with the sphere slides off during rotation of the sphere. As the result, the tactile sensation on which the roundish configurational sensation of the sphere is overlapped is transmitted to the user, and the reproducibility of tactile sensation becomes poor.

The present invention has been made in view of the above circumstances and provides an information perception apparatus that is capable of providing sufficient tactile sensation to a user with a small-sized apparatus and, when the apparatus is used as a pointing device, that is capable of providing the additional tactile sensation information without loosing the advantage as the pointing device. Furthermore, the present invention provides an information transmission system that uses the device, a memory medium that stores a program for driving the device, and a driving force generation apparatus that is suitable for driving the abovementioned information perception apparatus.

SUMMARY OF THE INVENTION

The present invention has been made in view of the above circumstances and provides an information perception apparatus including a perception unit on which a fingertip is to be placed supported movably in approximately parallel to the contact plane of the fingertip, a signal input unit that receives a motion signal including the information which indicates the displacement direction of the perception unit, and a driving unit that moves the perception unit corresponding to the motion signal supplied to the signal input unit.

In this information perception apparatus, because the perception unit on which a finger is placed is moved in the parallel direction to the contact surface of the finger based on the motion signal, the fingertip that is very sensitive to (tactile sensation is conducted to the perception unit and the contact force perception is given. Therefore, the high tactile sensitivity of the fingertip is utilized effectively, and strong contact sensation and force perception are given even though the motion of the perception unit is small.

At that time, because the fingertip is conducted by means of friction force between the fingertip and the perception unit, when the user does not want to perceive the tactile sensation, the user can be released from conduction easily, the user can discontinue the motion of the finger as desired, and the user is safe even when an erroneous motion is caused.

A position information input part that acquires a position information correspondingly to the operation of a user may be provided. In this case, this information perception apparatus is used as a pointing device that provides the position information to a unit to which the information perception apparatus is connected. As the system that enters the position information corresponding to the operation of a user, a known system used as pointing device such as a system that detects the relative movement magnitude by moving the pointing device as in the case of a mouse (ball+rotary encoder), a system in which the change with time of the contact position of a finger on a pad is detected to detect the motion direction and the change is correlated to the coordinate (detection of pressed position on a pressure sensor pad), or a system that calculates the position based on the inclination direction/inclination time of a stick (detection of bending direction of the stick by means of pressure sensor) may be used. The position information is not limited to the case in which the coordinate is indicated directly, but the information that provides the position information by processing the information may be used.

The connection may be wire connection or wireless connection, and the signal input unit or signal output unit is provided with an interface corresponding to the connection type. In the case where a built-in position input unit is provided as in the case of a note-type personal computer, an interface may be provided inside for connection.

In the case of input/output of information by way of the wire connection, an electric signal is transmitted through a conductive wire or an optical signal may be transmitted through an optical cable.

In the case of wireless connection, information transmission by means of electromagnetic wave or transmission by means of light, ultrasonic wave may be used.

The information perception apparatus may have the structure in which a displacement detection part that detects the displacement of the perception unit based on the operation of a user or displacement of the portion linked to the displacement of the perception unit is provided and the detection information detected by the displacement detection part is sent out by way of the signal output part, as the result the user can operate the perception unit to be displaced with the fingertip that is perceiving tactile sensation to transmit the detection information to the unit connected to the device.

By use of this apparatus, perception of the information through tactile sensation and output of the motion signal by means of operation of the fingertip are possible.

In detail, the perception unit is driven by a driving force to thereby detect the tactile information from the perception unit, and a user moves the fingertip to thereby move the perception unit, as the result the information, for example, the operation of the fingertip, is generated as a signal. In detail, it is possible that the control in which a restoring force proportional to the displacement is exerted, for example, when the perception unit is displaced forcedly by an external force, is applied. Furthermore in detail, a mouse having a click button on which the perception unit of the information perception apparatus is provided may be used. A scroll roller provided between buttons of a two-button mouse is used as the perception unit, and the roller is driven rotationally and a mechanism that is moved in the rotation axis direction based on the motion signal may be provided. By structuring the information perception apparatus as described hereinabove, a user can perceive the tactile information and respond immediately. Furthermore a user can set the displacement magnitude suitable for the user by comparing the detected displacement of the perception unit with the estimated movement magnitude of the perception unit, or can store the detected displacement of the perception unit as personal information and use it to specify the next user.

The perception unit may be structured so as to be displaced in the pressing down direction by a finger placed on the perception unit and in the shaking direction of a finger, as the result the finger of a user is conducted to press down and shake, these motions have a high degree of freedom. At that time, if the displacement is too large, the finger cannot follow the displacement of the perception unit, and the user cannot start the next operation quickly. The displacement is limited to 3 cm or smaller to thereby transmit the delicate tactile sensation consistently.

The perception unit may have the structure in which the driving unit is provided with a magnetic field generation part that generates magnetic flux in X-axis, Y-axis, and Z-axis directions orthogonal to each other, a first coil group including one or more coils disposed so that a part of winding crosses the magnetic flux generated by the magnetic field generation part in X-axis direction, and a second coil group including one or more coils disposed so that a part of winding crosses the magnetic flux generated by the magnetic filed generation part in Y-axis direction, wherein the driving current corresponding to the motion signal is supplied to the first coil group and the second coil group, and the perception unit is connected to the first coil group and the second coil group so as to displace based on the displacement of the first coil group and the second coil group caused by the supply of the driving current.

In the information perception apparatus described hereinabove, a driving force is exerted to the first coil group in Y-axis direction by supplying a current to the first coil group. On the other hand, a driving force is exerted to the second coil group in X-axis direction by supplying a current to the second coil group. Therefore, the first coil group and the second coil group are connected to the perception unit and the current is supplied to the first coil group and the second coil group controllably, and a driving force is thereby exerted to the perception unit in the arbitrary direction in an XY plane. The coil that is structured by winding wire flat in the XY plane to limit the size in Z-axis direction is used, and the coil is thereby driven stably. It is possible to overlap the first coil group and the second coil group one on the other to obtain a large driving force with a small sized structure.

It is desirable to use a magnet as a magnetic field generation part, but coils or coil groups other than the first and second coil groups may be used to generate a magnetic field.

At least any one of the first coil group and the second coil group may include two or more coils, the coil center of at least two coils among coils of the first coil group is disposed at different positions distant in X-axis direction, or the coil center of at least two coils among coils of the second coil group is disposed at different positions distant in Y-axis direction, and different currents are supplied to two or more coils included in the first coil group or the second coil group.

In this case, for example, different magnitude of current is supplied to two or more coils included in the first coil group, the driving force exerted to coils in Y-axis direction is thereby differentiated. The driving force in Y-axis direction may be reversed. Two or more coils to which the differentiated driving force is exerted are disposed at respective positions deviated from each other in X-axis direction to generate a torque and to provide a rotational driving force round Z-axis to the coil holder.

The current magnitude supplied to two or more coils included in the second coil group is controlled to differentiate the driving force in X-axis direction, and a torque is thereby generated similarly. In the case where both the first coil group and the second coil group include two or more coils, a rotational driving force may be generated in both coil groups.

A coil included in the first coil group and a coil included in the second coil group may disposed so as to cross the magnetic flux generated by a common magnetic field generation part.

In this case, because the magnetic flux crossing direction of the coil included in the first coil group and that of the coil included in the second coil group are different and orthogonal to each other, driving forces in X-axis direction and Y-axis direction are generated by means of only the common magnetic flux namely a magnetic flux in one direction. Accordingly, it is possible to structure a simple and small-sized apparatus and to obtain a large driving force.

The magnetic field generation part may include plural magnetic field generation members arranged in X-axis direction or Y-axis direction, which magnetic field generation members located adjacent to each other generate the magnetic flux in the opposite direction of Z-axis, and the coil is disposed so that portions facing each other with interposition of the winding center cross the flux in the opposite direction respectively.

In such a driving force generation apparatus, currents in the opposite directions are generated on the portions facing each other with interposition of the winding center of a coil, the direction of the magnetic flux that these portions cross is also opposite, as the result the driving force in the same direction is exerted to the facing portions of the coil. Therefore, one coil generates a large driving force, and a small-sized apparatus that is capable of generating a large driving force is obtained.

The information perception apparatus as described hereinabove that is used together with the information processing apparatus from which the motion signal is supplied by way of the signal input unit of the information perception apparatus is used as a tactile information transmission system.

In such an information transmission system, the motion signal is supplied from the information processing apparatus by way of the signal input unit of the information perception apparatus, and the driving force is exerted to displace the perception unit based on the signal and the information perception apparatus is operated. Thereby, the perception unit can perform various operations with linking to the information processing apparatus. A user who is placing a part of the body on the perception unit can perceive the motion of the perception unit, and can obtain various information by means of the motion pattern, timing, and displacement. The signal is transmitted between the signal input unit and the information processing apparatus through wire connection or wireless connection.

The perception unit may be provided with a contact detection sensor that detects a fingertip of a user when the fingertip is brought into contact on the perception unit and transmits a contact detection signal to the information processing apparatus.

This apparatus detects whether a part of a human body is in contact with the apparatus or not by means of the contact detection sensor, and follows the load change concomitant with contact/separation of a fingertip based on the contact detection signal generated from the contact detection sensor. In detail, when a part of a human body separates from the apparatus and the load is reduced steeply, it is possible to control the apparatus to reduce the driving force or stop the driving correspondingly to the load.

The information perception apparatus of the present invention is structured so that a position information input part is provided, input position information is supplied to the information processing apparatus, and a motion signal corresponding to the position information is sent out from the information processing apparatus to the information perception apparatus.

By using the motion signal corresponding to the position information supplied from the position information input part as described hereinabove, the virtual space that is set based on the information stored in the information processing apparatus is correlated to the tactile sensation. Therefore, a user can perceive the structure of the virtual space through tactile sensation. At that time, in the case where the information transmission system includes a display apparatus, the visual information displayed on the display apparatus is acquired, and simultaneously the tactile information is obtained from the information perception apparatus.

Therefore, it is possible that a user recognizes and understands an object through the visual information and also through the tactile information, and the user can acquire the information that is different from the information acquired only through any one of visual sensation and tactile sensation. In the case where a display apparatus is not used, it is possible that the user recognizes a virtual space through tactile sensation, and the tactile information equivalent to the visual information is presented to a fingertip. It is possible that a visually disable person who can recognize the character only by means of Braille conventionally can recognize the ordinary word and characters by means of continuous operation. Furthermore it is possible that a user performs operation while the user is obtaining the tactile information in the status where it is difficult for the user to perform predetermined operation on the information process apparatus while the user is seeing the visual information.

In the case of the information perception apparatus having a display apparatus, the function to display a pointer in a screen displayed on the display apparatus is provided, the perception unit is driven based on the motion signal corresponding to the position of the pointer in the image.

In the tactile information transmission system as described hereinabove, the tactile sensation corresponding to the position of the pointer in the image displayed on the image display apparatus can be acquired from the perception unit. It is possible to acquire the tactile sensation corresponding to the position of the pointer when the pointer is moved in the image, and it is possible to recognize based on the displayed image and plural tactic sensations.

In the case of the information transmission system, a user moves the pointer in the image while the user is acquiring the tactile information by mean of the information perception apparatus, and perceives the tactile sensation corresponding to the position of the pointer. Therefore, it is possible to obtain from the perception unit of the information perception apparatus the tactile sensation corresponding to the configuration that is changing continuously on the image displayed on the display apparatus.

Furthermore, in the case of the information transmission system as described hereinabove, it is possible that the information perception apparatus is operated based on the information transmitted from a remote place through the network and the tactile information can be transmitted between users who are located far distant from each other.

The information transmission may be real time, or otherwise the information is stored temporarily and then the tactile information may be perceived later. The information transmitted through the network may be only the motion signal of the tactile sensation, or otherwise only the display information is transmitted and the motion signal is correlated to the obtained display image on the information processing apparatus side that has received the display information.

In the information transmission system as described hereinabove, the motion signal for driving the information perception apparatus arbitrarily controls the motion of the perception unit such as stop, movement magnitude, moving speed, and acceleration, and changes these magnitudes over time. For example, the motion signal includes the space coordinate data that indicates the position or area where the perception unit is moved, includes the function having the coordinate as the parameter, or includes the time data that determines the speed or acceleration of the motion. The perception unit is driven based on such motion signal, as the result the predetermined motion is transmitted from the perception unit to a finger and a user can perceive the information based on the motion of the finger while the user is placing the finger on the perception unit.

When the pointer is very near going out from the range of the presentation position or presentation area of the tactile force sensation in the virtual space that is set to the information processing apparatus, the perception unit may be moved so as to give the sensation that the perception unit is coming close to the boundary of the presentation position or presentation area. Thereby, a user can recognize whether the finger of the user is located in the area where the information is presented without viewing the screen, and it is possible that the user recognizes the information without protrusion of the pointer from the predetermined information presentation area. The recognition part without using the visual sensation is effective as the information acquisition method in the working circumstances, in which a worker cannot look away from the target, such as speech to audiences or on camera, machine work, and video camera working while viewing through a finder.

The perception unit may be moved when a pointer overlaps on the place where the text information or the image information such as a diagram or photograph displayed on a display is linked to the tactile information, or otherwise the perception unit may be displaced depending on the distance between the pointer and the linked portion. Thereby, it is possible that a user can detect the important point in a document, or the text or diagram area that link to other text information and image information such as Hyper Text in the Internet homepage by means of the tactile stimulation when the cursor overlaps on these areas.

The displacement magnitude, speed, or acceleration of the perception unit are visualized and are displayed on a display apparatus to obtain the tactile stimulation corresponding to the position of the pointer in the image displayed on the display unit, and the visual information corresponding to the tactile stimulation is obtained from the image. By perceiving the visual information and tactile sensation simultaneously as described hereinabove, it is possible to recognize these sensations with close correlation. By displaying the output status of the tactile sensation visually, it is possible to recognize the relation between the pointer and the object, namely the pseudo contact between the set objects in the virtual space and the finger.

BRIEF DESCRIPTION OF THE DRAWINGS

Preferred embodiments of the present invention will be described in detail based on the followings, wherein.

DETAILED DESCRIPTION OF THE PREFERRED EMBODIMENTS

The embodiments of the present invention will be described in detail hereinafter with reference to the drawings.

Figure 1A:
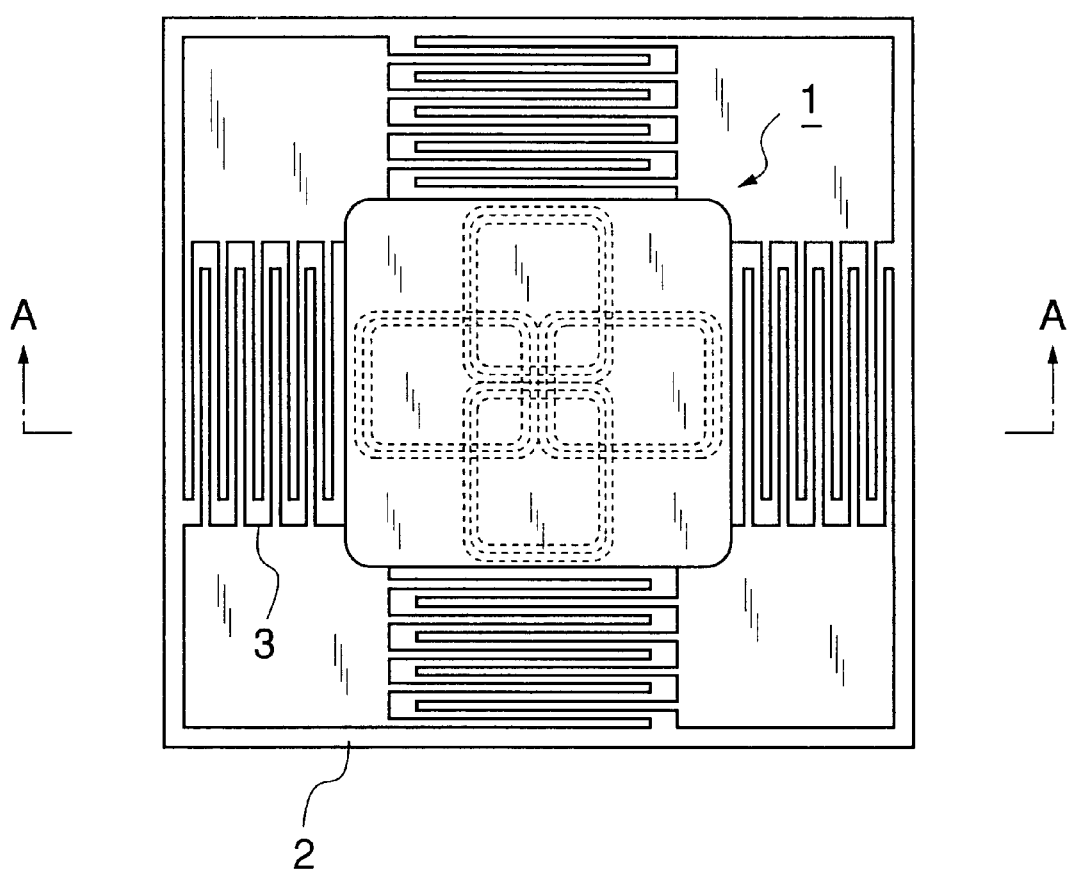
FIG. 1A and FIG. 1B are schematic structural diagrams for illustrating an information perception apparatus in accordance with one embodiment of the present invention.
Figure 1B:
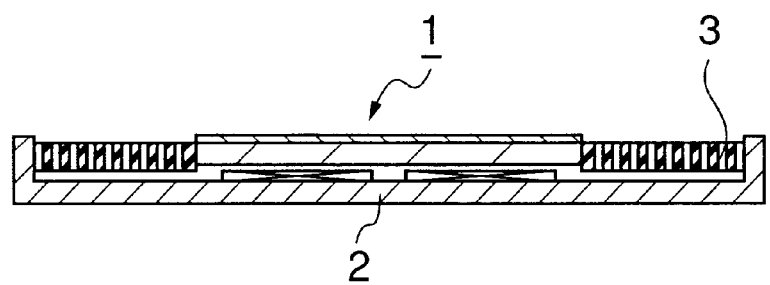

FIG. 1A and FIG. 1B are schematic structural diagrams for illustrating an information perception apparatus in accordance with one embodiment of the present invention and FIG. 1A is a plan view, FIG. 1B is a cross sectional view along the line A—A in FIG. 1A.

The information perception apparatus is provided mainly with a plate-like base 2 having the edge projected upward, a perception unit 1 having a magnet fixed to the base and plural coils fixed to the perception unit 1 supported movably in the horizontal direction above the magnet, and an elastic member 3 for connecting between the perception unit 1 and the base 2.

The elastic member 3 is provided at about four locations on the periphery of the perception unit 1, one end of each elastic member is bonded to the perception unit 1 and the other end is bonded to the side edge of the base 2. The perception unit 1 remains at the standard position by means of the elastic member while a current is not being supplied to the coil, but the perception unit 1 is supported so as to allow the displacement in X-axis and Y-axis direction or rotational displacement as described hereinafter, wherein X-axis refers to the horizontal direction and Y-axis refers to the vertical direction in FIG. 1A.

Figure 2A:
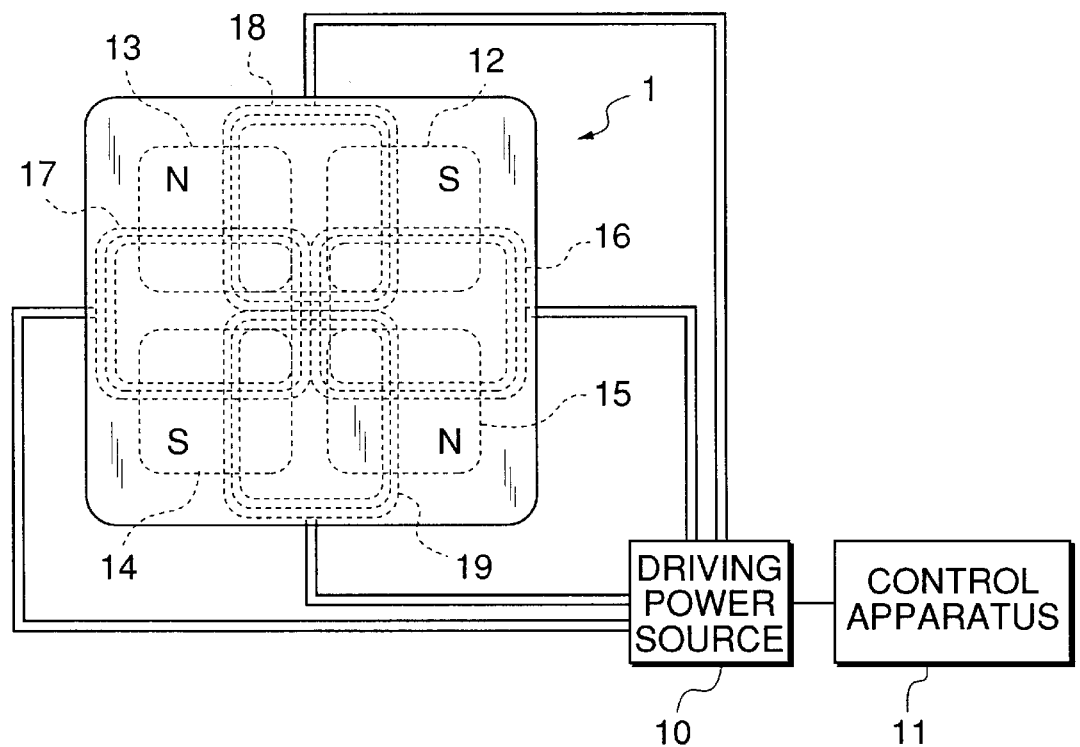
FIG. 2A and FIG. 2B are schematic structural diagrams for illustrating a driving force generation apparatus used in the information perception apparatus shown in FIG. 1.
Figure 2B:
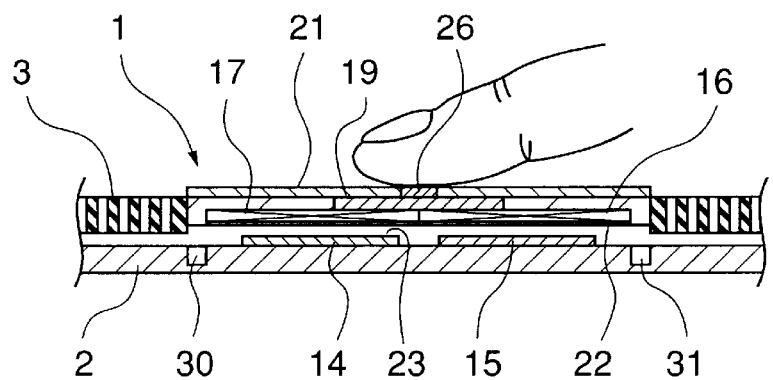

FIG. 2A and FIG. 2B show a driving unit of the perception unit 1.

The driving unit is provided with about four magnets 12, 13, 14, and 15 provided and fixed to the base 2 as the magnetic field generation part as shown in FIG. 2A. An X-Y coordinate system having the origin at the center of the perception unit 1 is set for convenience. These magnets 12, 13, 14, and 15 are disposed on the first quadrant, the second quadrant, the third quadrant, and the fourth quadrant respectively. The direction of the magnetic field of these magnets is perpendicular to the surface of the base 2, and the top of the magnet 12 and the magnet 14 is S pole and the bottom is N pole. On the other hand, the top of the magnet 13 and the magnet 15 is N pole and the bottom is S pole.

The magnets 12, 13, 14, and 15 are fixed on the base 2 as shown in FIG. 2B, and the perception unit 1 is supported movably. four coils 16, 17, 18, and 19 are fixed to the perception unit 1, the coil 16 is disposed at the location so as to spread over the first quadrant and the fourth quadrant, and fixed so that a current flows across the magnetic field of the magnet 12 and the magnet 15 in parallel to X-axis. In the same manner, the coil 17 is disposed so as to spread over the second quadrant and the third quadrant, and fixed so that a current flows across the magnetic field of the magnet 13 and the magnet 14 in parallel to the X-axis. On the other hand, the coil 18 is disposed so as to spread over the first quadrant and the second quadrant, and fixed so that a current flows across the magnetic field of the magnet 12 and the magnet 13 in parallel to Y-axis. The coil 19 is disposed in the same manner as the coil 18. The coils 16 and 17 form the first coil group, and the coils 18 and 19 form the second groups. These coils 16, 17, 18, and 19 are combined together to the perception unit 1, the perception unit is connected movably to the base 2 with interposition of the elastic member 3.

The coils 16, 17, 18, and 19 are provided with a driving power source 10 that supplies a current independently and control apparatus 11 that controls the output current or voltage supplied from the driving power source 10.

Sliding members 22 and 23 are provided between the perception unit 1 and the magnets 12, 13, 14, and 15 so that both are slidable. The layered fluororesin (for example, polytetrafluoroethylene), which is a low-friction material, is used for these sliding members. The material used for the abovementioned sliding member is not limited to the above-mentioned fluororesin, other materials such as resin or metal impregnated with lubricating oil may be used. Otherwise, lubricating oil may be applied between sliding members 22 and 23. Further otherwise, balls of non-magnetic material may be used between the sliding members 22 and 23, and the perception unit may be moved by means of rolling of the balls.

The top surface of the perception unit 1 is finished flat so that a perception organ such as a human finger or palm can be in contact with the surface as shown in FIG. 2B. In the present embodiment, the center portion of the top surface of the perception unit 1 is the place where a fingertip is placed.

Figure 3:
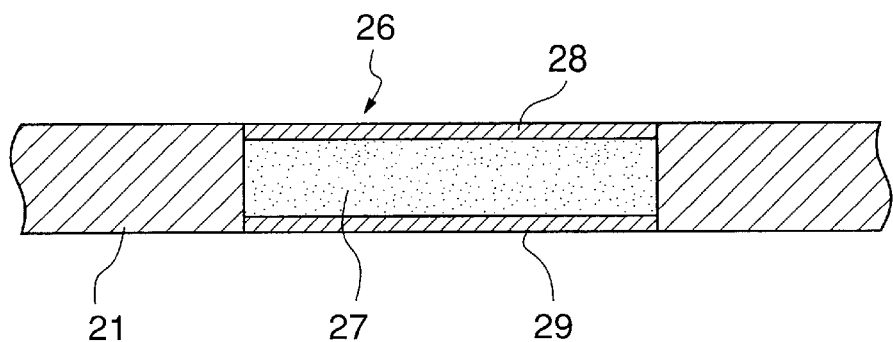
FIG. 3 is an enlarged view for illustrating a contact detection sensor used in the information perception apparatus shown in FIG. 1.
Figure 4:
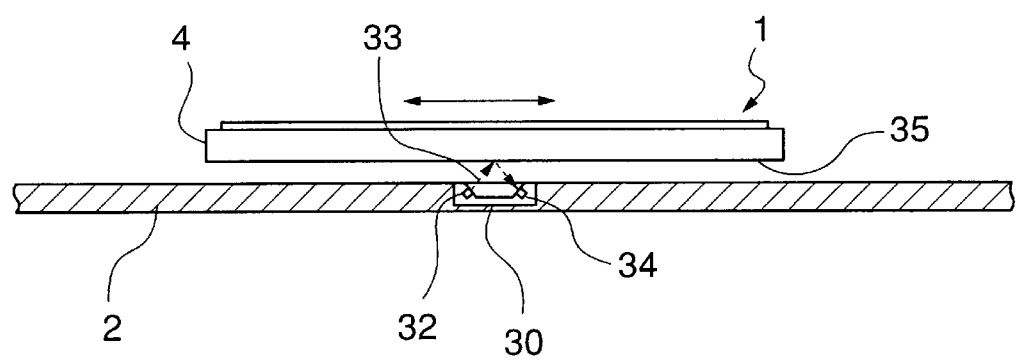
FIG. 4 is a schematic structural diagram for illustrating a displacement detection sensor used in the information perception apparatus shown in FIG. 1.

A pressure sensor unit 26 for detecting the contact of human fingertip is provided at the center portion area of the surface layer 21 of the perception unit 1 as shown in FIG. 3. The pressure sensor unit 26 detects the contact pressure when a fingertip is brought into contact. A method in which a pressure is converted into an electrical resistance is used as the method for detection of the contact. In detail, the pressure sensor unit 26 is provided with a pressure sensitive conductive rubber member 27 made of material containing silicone rubber and conductive powder, and provided with conductive plastic layers 28 and 29 on both sides of the pressure sensitive conductive rubber member 27. When a fingertip touches the pressure sensor unit 26, the electrical resistance of the pressure sensitive rubber member 27 to which a voltage is applied with interposition of the conductive plastic layers 28 and 29 is reduced by means of the contact pressure to thereby detect the contact. The contact detection signal is transmitted to the control unit 11, and the driving power source 10 is controlled based on the signal.

Otherwise, a method in which a charge accumulation unit that maintains some charge on the perception unit is provided, and the charge flows out when a fingertip touches the perception unit, the charge change is detected to thereby detect the contact may be used as the method for detection of the contact though it is not shown in the drawing. Further otherwise, a method in which two flexible electrodes are supported so that the distance between the electrodes is variable, the electrostatic capacity between the electrodes changes due to contact pressure when a fingertip touches it, and the change is detected to thereby detect the contact may be used.

On the other hand, as shown in FIG. 2B, displacement detection sensors 30 and 31 are provided to detect the relative displacement between the base and the perception unit 1. A light reflection type photo interrupter is used as the displacement detection sensors 30 and 31. In each of the displacement detection sensors 30 and 31, an optical pattern 35 is provided on the bottom side of the perception unit 1, a light 33 emitted from the LED 32 is irradiated onto the surface, the light reflected on the optical pattern 35 is detected by a photo transistor 34. The voltage change caused from light density change due to the optical pattern 35 is detected by, for example, a collector output type circuit, and the voltage change is converted to the movement magnitude of the perception unit 1 based on the frequency. Displacement detection sensors deployed in X-axis direction and Y-axis direction detect the movement magnitude of the perception unit 1 that moves in a plane. The displacement signal is transmitted to the control apparatus 11 and the driving power source 10 is controlled. The white and black striped regular interval pattern is generally used as the optical pattern 35, but other patterns such as fine checked pattern and ladder pattern may be used.

As another method for reading the optical pattern to detect the movement magnitude, a method that utilizes laser speckle may be used. In this method, a laser beam is irradiated onto the surface of the perception unit where fine grooves and ridges are formed to generate a bright and dark light speckle pattern due to interference, the pattern is observed by a two-dimensional image sensor, and the movement magnitude of the pattern is measured. alternatively, another method may be used in which a rotor that is contact with the perception unit itself is provided and the rotation magnitude is detected by an encoder. This method is similar to the method in which the movement magnitude of a mouse is detected.

It is desirable that the coercive force and the residual magnetic flux density of the magnets 12, 13, 14, and 15 provided in the driving force generation apparatus are large, neodymium magnet, neodymium is a rare earth element, which is widely used for driving a hard disc widely, is suitably used in this case, but other magnet may be used. Copper wire is used generally for the coils 16, 17, 18, and 19, but copper-clad aluminum wire may be used to reduce the weight. The weight of the coils is approximately 40% or more lighter in comparison with coils of copper wire.

Next, the operation of the information perception apparatus shown in FIG. 1A and FIG. 1B is described.

The coils 16, 17, 18, and 19 are operated base on the Fleming's left hand rule (the middle finger denotes a current and the index finger denotes a magnetic field, then force is exerted in the direction of the thumb). Addressing on the coil 16, a current passes in X-axis direction in the magnetic field that extends in Z-axis direction namely the direction perpendicular to the base 2 as shown in FIG. 2A and FIG. 2B, and the current causes the force in Y-axis direction. As the result, when a current is supplied to the coil 16 clockwise, the coil 16 generates a force in +Y-axis direction. The direction of the force is changed by changing the direction of the current, and the magnitude of the force is changed by changing the current value.

Similarly to the coil 16, with respect to the coil 17 which generates a force in Y-axis direction, a current is supplied anti-clockwise to generate a force in the same direction as that of the coil 16.

As described hereinabove, a current can be supplied so that the coil 16 and coil 17 generate a force in the same direction. To realize the force in the same direction, it is the easiest to connect the both coils form a series circuit. Alternatively, coils are connected individually, and currents are supplied in the predetermined direction respectively.

The coils 18 and 19 also generate the force in X-axis direction based on the same mechanism.

Furthermore, a force for rotation in the direction round, for example, Z-axis can be generated in addition to X-axis and Y-axis direction of the force generation. When a current is supplied to the coil 16 in the clockwise direction and a current is supplied to the coil 17 in the clockwise direction, the both coils are forced to move in the opposite direction to each other, and a torque acts resultantly on the perception unit 1. In this case, when currents of the same magnitude but opposite sign are supplied, a rotational force is generated round Z-axis, but when two currents of different magnitude are supplied to the coils 16 and 17, the rotation center can be deviated intentionally.

The force in X-axis direction and Y-axis direction is generated at the arbitrary timing by controlling the driving power source 10 by the control apparatus 11. The perception unit 1 is moved in various directions in an XY plane by the force. A perception receiving user who contacts his fingertip with the perception unit 1 can feel the motion of the perception unit 1. It is possible to reproduce various virtual surface images by utilizing this action. Examples are described hereinafter.

Figure 5:
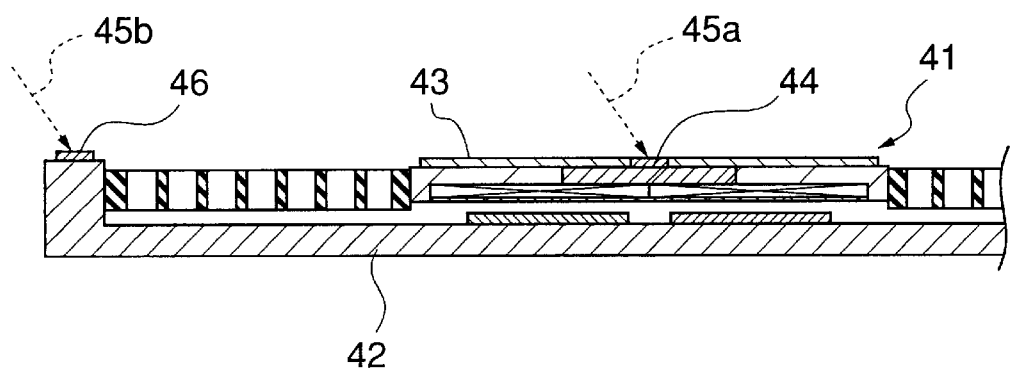
FIG. 5 is a schematic structural diagram for illustrating another example of a contact detection sensor used in the information perception apparatus shown in FIG. 1.

FIG. 5 is a schematic structural diagram for illustrating a contact detection part used in the above information perception apparatus. As shown in FIG. 5, a light receiving element 44 the resistance of which changes depending on the light 45a received from the external is embedded in the surface layer 43 of the perception unit 41. The light receiving element 44 detects the non-contact status based on the received light 45a from the external while a human hand or finger is not in contact with the perception unit 41. Another light receiving element 46 is embedded in the base 42 at the location where the light receiving element 46 receives the light 45b from the external under the approximately same condition as that of the light 45a.

In this apparatus, the light receiving element 44 detects the darkening when a fingertip touches on the perception unit 41 and another light receiving element 46 detects no change, as the result the touching of a finger on the perception unit 41 is detected. When the both light receiving elements 44 and 46 detect the dark, the apparatus judges the light from the external to be turned off and does not operate erroneously. Therefore, the driving power source can be controlled so that the driving unit is driven based on the signal when the contact of a fingertip on the perception unit 41 is detected, on the other hand controlled so that the driving unit is stopped based on the signal when the separation of the fingertip from the perception unit 41 is detected.

Next, the result obtained by measuring the driving force exerted by the coil and magnet by use of the information perception apparatus shown in FIG. 1A and FIG. 1B is described.

The size of each coil used in this experiment is described hereunder. The coil wire diameter is about 0.15 mm, the coil cross sectional area is about 1×2 mm$^2$, the height is about 16 mm, and the width is about 8 mm. A neodymium magnet with a thickness of about 2 mm is used as the magnet. The measurement result of the driving force exerted by the coil and magnet is shown in FIG. 6.

Figure 6:
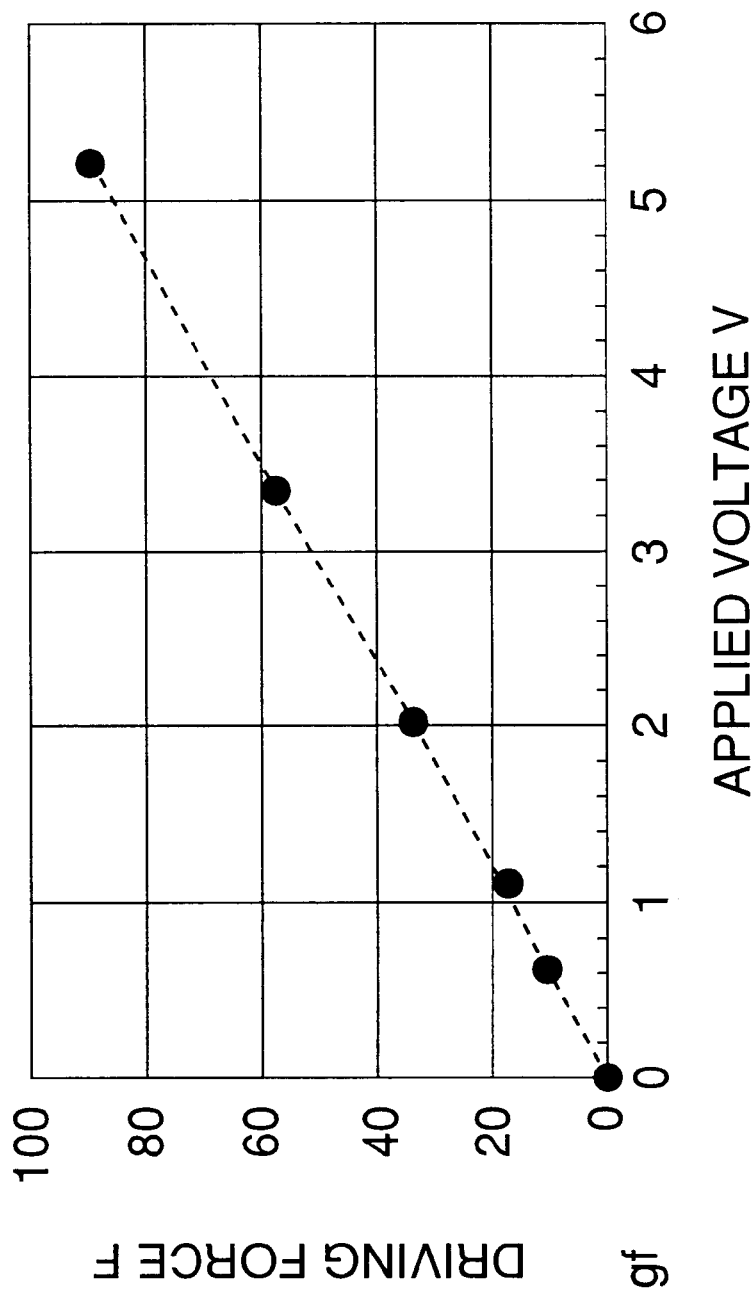
FIG. 6 is a graph for describing the relation between the voltage applied to a coil of the driving force generation apparatus shown in FIG. 2 and the driving force.

As shown in FIG. 6, the driving force increases linearly with increasing applied voltage. It is found that the driving force of approximately 18 gf is generated per 1 V, and the driving force of approximately 90 gf is generated by applying the voltage of about 5 V. The voltage is converted into a current value, and the current value of about 0.5 A and the power of about 2.5 W are obtained because the coil resistance is approximately 10Ω.

It is confirmed that, when a fingertip touches on the perception unit with the force equal to or stronger than the force that is involved in handling of a key board or a operation button of a mouse with a fingertip, sufficient in-plane displacement is induced to the fingertip by providing the in-plane (tangent) driving force of 20 to 40 gf from the information perception apparatus to the fingertip. Therefore, the abovementioned driving force is functionally sufficient for the information perception apparatus.

Figure 7A:
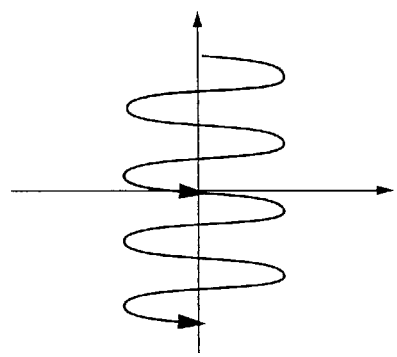
FIG. 7A to FIG. 7D illustrate exemplary operations reproduced by the perception unit of the information perception apparatus shown in FIG. 1.
Figure 7B:
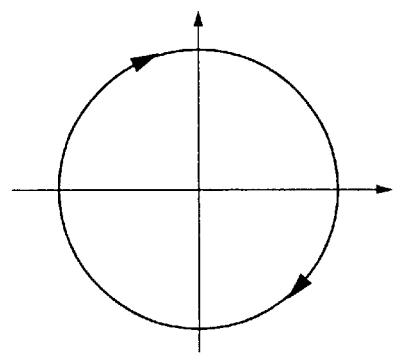
Figure 7C:
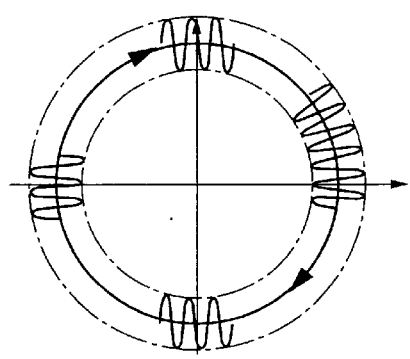
Figure 7D:
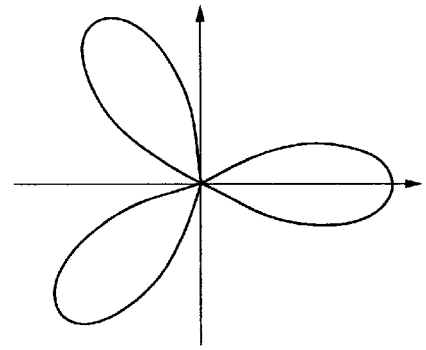

FIG. 7A to FIG. 7D illustrate a driving state of the perception unit in the above information perception apparatus. The information perception apparatus supplies the current of various magnitudes controlled independently from the driving power source 10 to the coils 16, 17, 18, and 19 to allow a perceiver to recognize various information by means of motion pattern, motion timing, and displacement of the perception unit 1. For example, it is possible to reproduce various analogue waveforms shown in FIG. 7A, FIG. 7B, FIG. 7C, and FIG. 7D. FIG. 7A reproduces the motion that a finger rubs an object, FIG. 7B reproduces the motion that a finger traces a smooth surface, and FIG. 7C reproduces the motion that a finger traces a rough surface. The waveform shown in FIG. 7D is not the reproduction of tactile information of an object but the reproduction of symbolic information. Various tactile information waveforms could allow a user to use them as values, symbols, and commands of a new expression method instead of the conventional Braille.

Figure 8A:
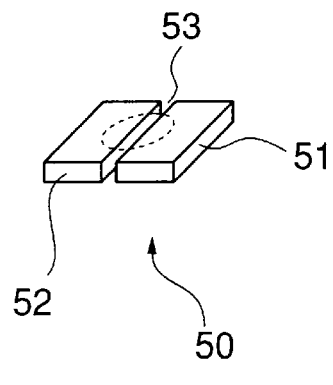
FIG. 8A and FIG. 8B illustrate an exemplary reproduction of the configurational feeling on the information perception apparatus shown in FIG. 1.
Figure 8B:
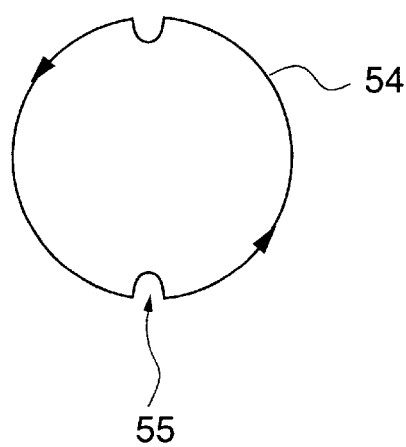

FIG. 8A and FIG. 8B illustrate an exemplary reproduction of the configurational feeling of the perception unit 1. In FIG. 8A, the material information 50 including two plates 51 and 52 disposed with interposition of a gap 53 is traced with a finger, and the existence of the gap 53 is reproduced as the tactile sensation. In this case, the perception unit 1 gives the motion of Lissajous's tracing waveform 54 shown in FIG. 8B to a fingertip. The fingertip is moved following the motion, and two discontinuous points 55 in FIG. 8B gives the step feeling to the fingertip. As the result, according to the close correlation to the image shown in FIG. 8A displayed on a screen, the existence of the gap 53 is recognized.

Figure 9:
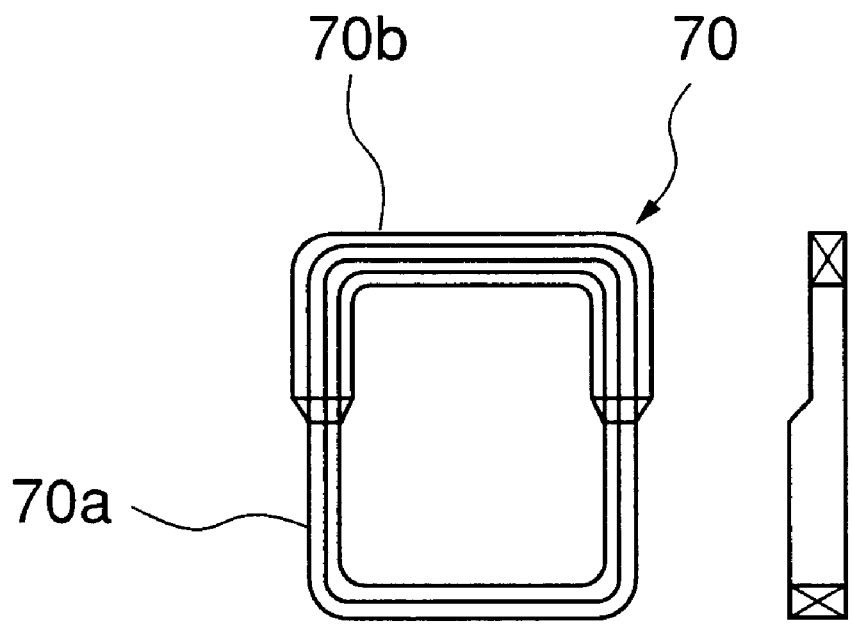
FIG. 9 illustrate another example of a coil used in the driving force generation apparatus shown in FIG. 2.

FIG. 9 illustrates a single coil used in the information perception apparatus in accordance with another embodiment of the present invention. A coil 70 has a portion 70a that is thick in the thickness and is narrow in the width and a portion 70b that is ½ thick in the thickness and is doublewide in the width as shown in a cross sectional view. Such configuration allows the first coil group and the second coil group to be overlapped in a thickness of one coil.

Figure 10A:
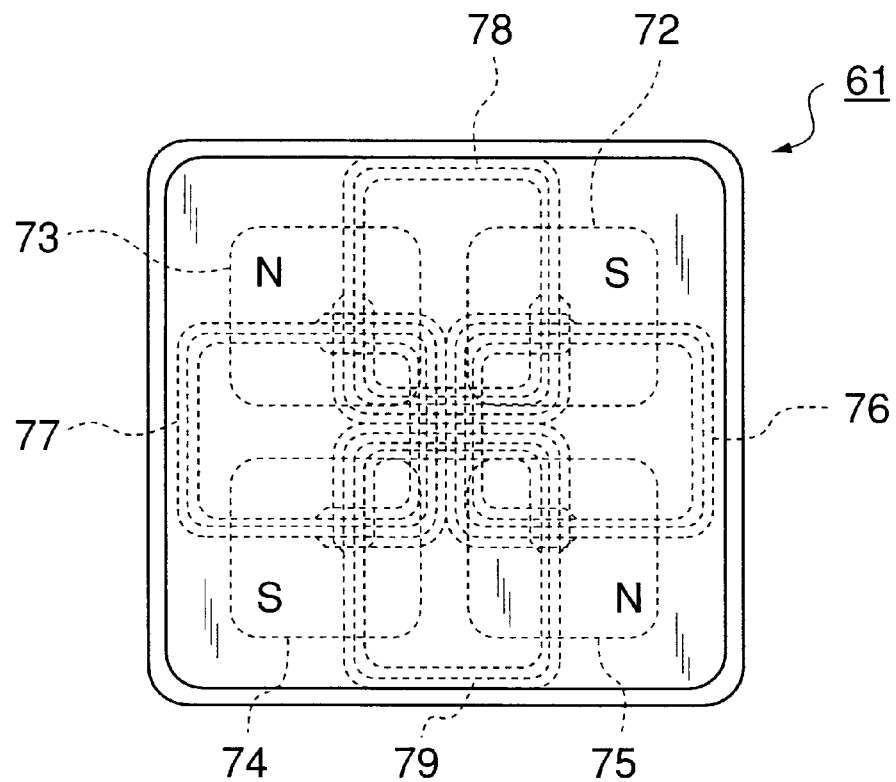
FIG. 10A and FIG. 10B are schematic structural diagrams for illustrating another example of a driving force generation apparatus in accordance with the present invention.
Figure 10B:
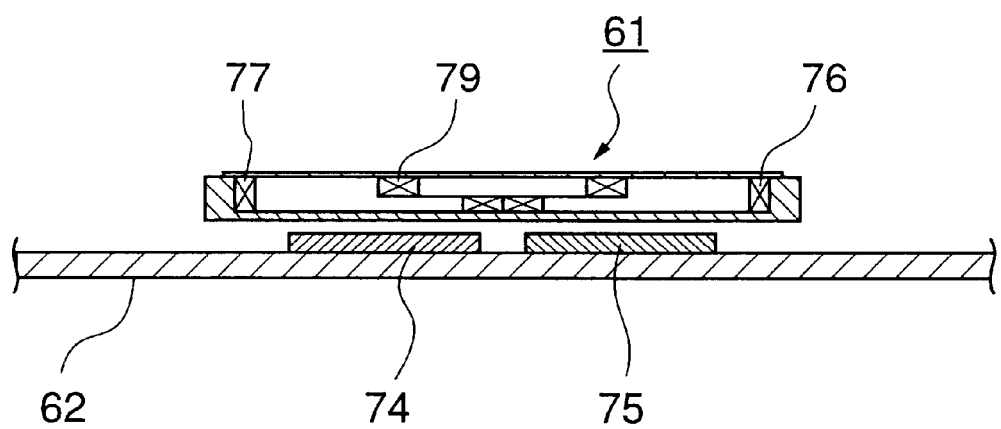

FIG. 10A and FIG. 10B are an example of using the coil in FIG. 9 and is a schematic structural diagram for illustrating another embodiment of the present invention. This information perception apparatus is provided with four magnets 72, 73, 74, and 75 on a base 62, and a perception unit 61 to which four coils 76, 77, 78, and 79 are fixed is supported movably with respect to the base 62 above the magnets. The configuration of these coils 76, 77, 78, and 79 is the same as those shown in FIG. 9, and these coils are overlapped partially each other as shown in FIG. 10B.

If the width and the thickness of these coils are even as those shown in FIG. 2B, the coils 16 and 17 of the first coil group for generating the driving force in Y-axis direction and the coils 18 and 19 of the second coil group for generating the driving force in X-axis direction must be disposed on different levels. As the result, the gap between the coil and the magnet is different between the first coil group and the second coil group, and the difference in the driving force between X-axis direction and Y-axis direction is caused even when the same voltage is applied. To solve this problem, it is possible to balance the driving force by applying correction on the voltage previously for each driving direction, but it is basically desirable to dispose the first coil group and the second coil group on the same level in order to eliminate the difference.

In the apparatus shown in FIG. 10A and FIG. 10B, because the thickness of the coils is different on the portions where the coils 76, 77, 78, and 79 are overlapped, the coils can be overlapped and contained in a thickness of a single coil as a whole without changing the number of winding as shown in FIG. 10B. The driving force generation apparatus is operated in the same manner as used for the apparatus shown in FIG. 2A and FIG. 2B, and the perception unit is driven as desired.

Figure 11:
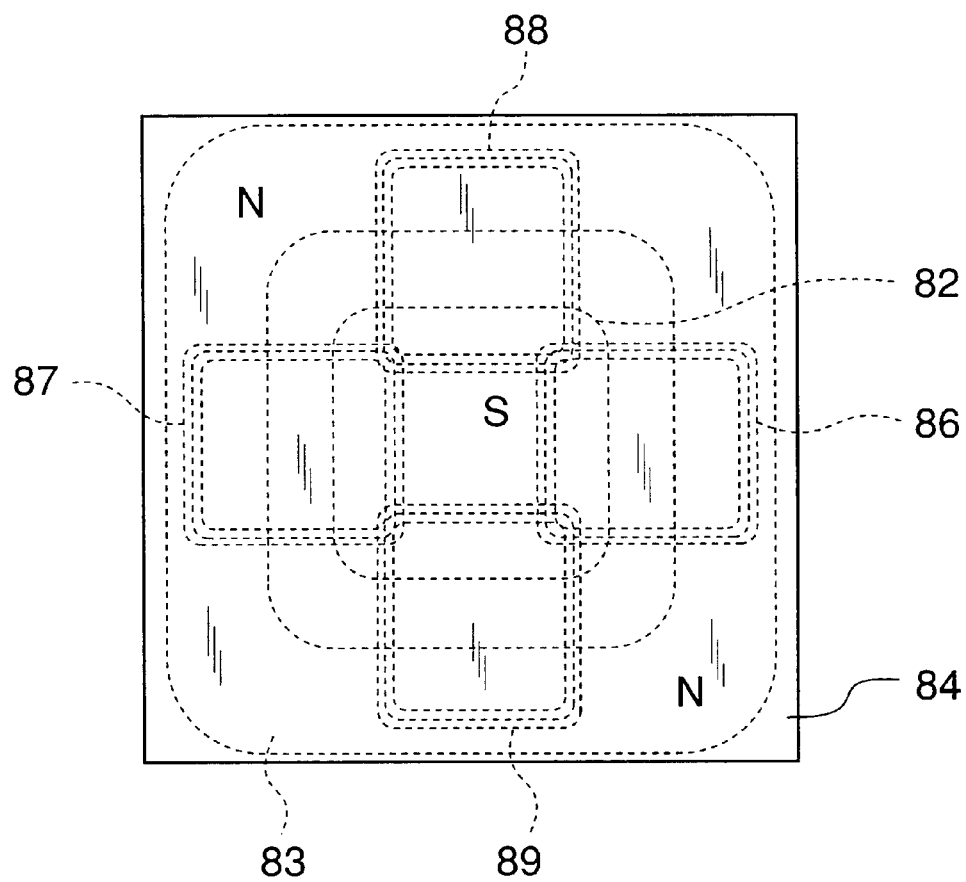
FIG. 11 is a schematic structural diagram for illustrating another example of a driving force generation apparatus in accordance with the present invention.

FIG. 11 is a schematic structural diagram for illustrating another example of a driving force generation apparatus which can be used in an information perception apparatus in accordance with the present invention. This driving force generation apparatus is provided with a magnet 82 disposed S-pole upside and a magnet 83 disposed N-pole upside that surrounds the magnet 82. A perception unit 84 to which four coils 86, 87, 88, and 89 are fixed is supported movably with respect to a base above the magnets 82 and 83. The coils 86 and 87 and the coils 88 and 89 generate the driving force in X-axis direction and Y-axis direction respectively. This apparatus is different from the apparatus shown in FIG. 2A and FIG. 2B in that the coil combination is arranged so that the coils arranged in X-axis direction generate the driving force in X-axis direction and the coils arranged in Y-axis direction generate the driving force in Y-axis direction. This type of driving force generation apparatus drives the perception unit 84 as desired by controlling the current supplied to each coil.

Figure 12A:
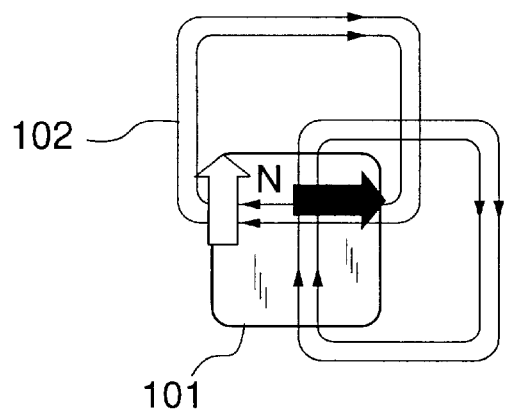
FIG. 12A to FIG. 12C are schematic structural diagrams for illustrating exemplary layouts of magnets and coils used in a driving force generation apparatus in accordance with the present invention.
Figure 12B:
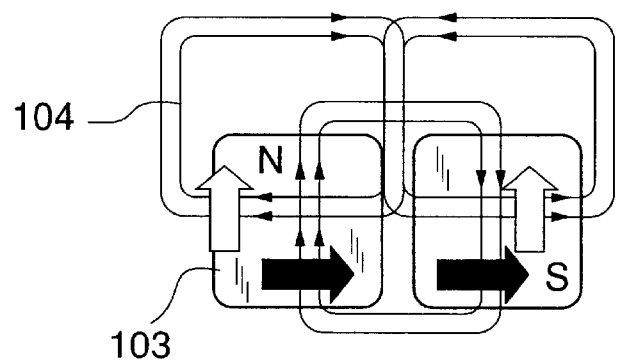
Figure 12C:
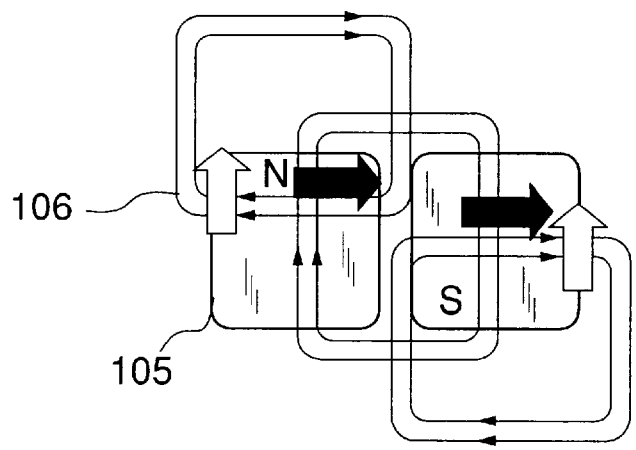

FIG. 12A to FIG. 12C are schematic structural diagrams for illustrating exemplary layouts of magnets and coils used in a driving force generation apparatus. FIG. 12A shows the maximum unit of the driving force generation apparatus, and this apparatus is provided with a magnet 101 and about two coils 102 for generating the driving force in X-axis direction and Y-axis direction respectively disposed above the magnet 101. In FIG. 12B, about two magnets 103 are arranged, about two coils 104 for generating the driving force in Y-axis direction are arranged in the same direction in series above the magnets 103, and a coil for generating the driving force in X-axis direction is disposed. In FIG. 12C, about three coils 106 are disposed above two magnets 105 so that the center position of these coils 106 is separated from each other instead of linear arrangement. As described hereinbefore, various layouts of coils and magnets are applicable. Bold arrows in FIG. 12A to FIG. 12C show the direction of the driving force generated by coils respectively.

Figure 13:
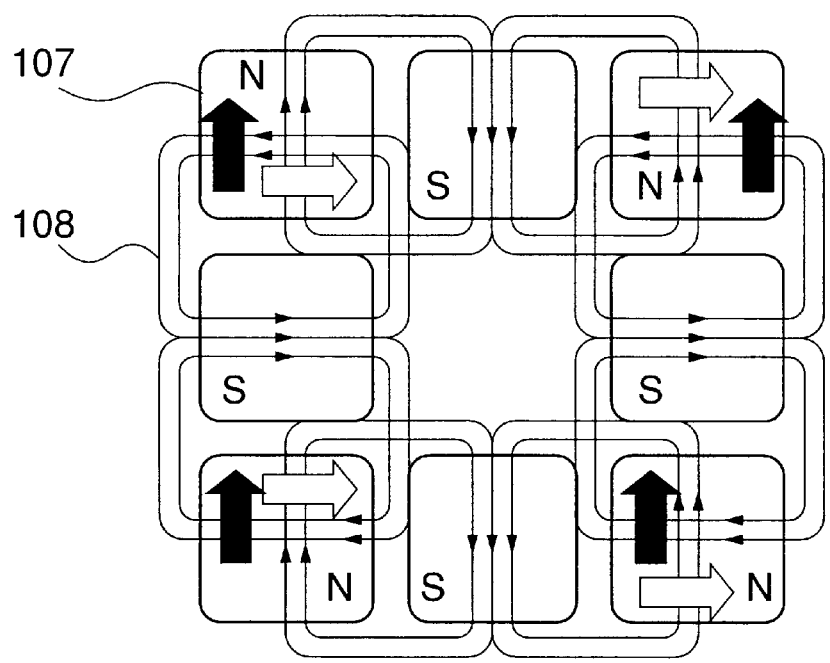
FIG. 13 is a schematic diagram for illustrating another exemplary layout of magnets and coils used in a driving force generation apparatus in accordance with the present invention.
Figure 14:
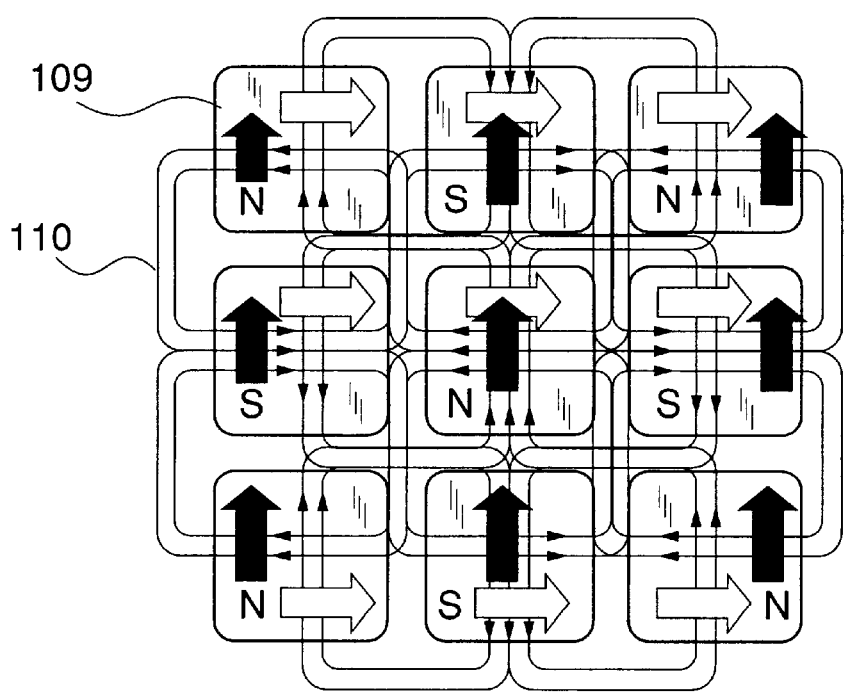
FIG. 14 is a schematic diagram for illustrating an exemplary modified layout of magnets and coils shown in FIG. 13.

FIG. 13 is a schematic structural diagram for illustrating an exemplary layout of magnets and coils in a driving force generation apparatus having plural coils and magnets. Magnets 107 are arranged in matrix of about three rows and three columns, and the number of coils 108 for supplying the current perpendicularly to the magnetic field is increased concomitantly. Many small coils are used and magnets 107 and coils 108 are arranged in a matrix format, this structure can generate the approximately same driving force as a large coil. The coils can be made small and thin, the distance between a coil and magnet can be the nearer, and the effect of the driving force is improved. In FIG. 14, a magnet 109 and a coil 110 are provided at the center position of the matrix shown in FIG. 13 to increase the density. Bold arrows in FIG. 13 and FIG. 14 show the direction of the driving force generated by coils respectively, the driving force having an arbitrary magnitude in an arbitrary direction is generated by controlling a current supplied to each coil.

Figure 15:
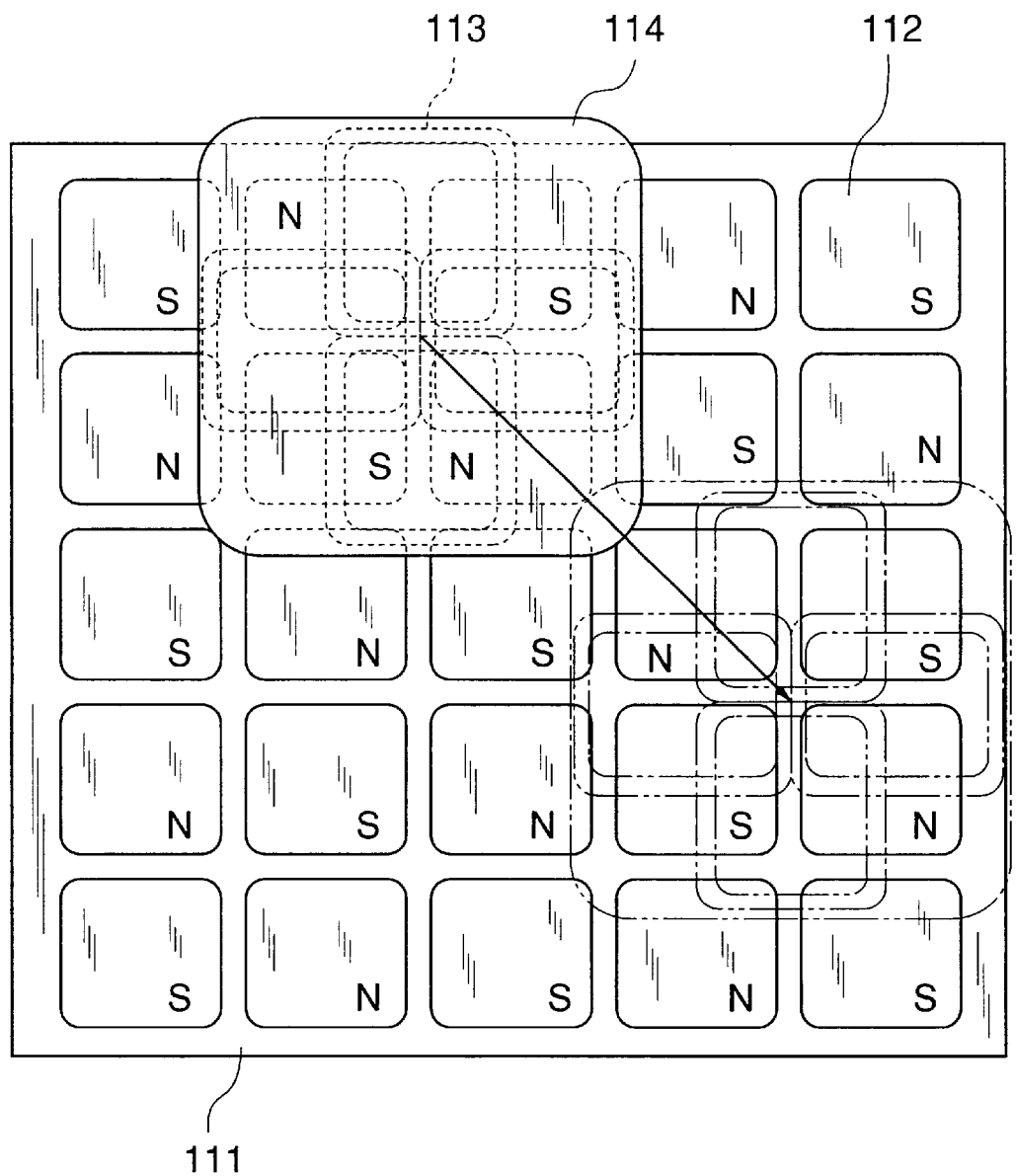
FIG. 15 is a schematic structural diagram for illustrating another example of a driving force generation apparatus in accordance with the present invention.

FIG. 15 is a schematic structural diagram for illustrating another example of a driving force generation apparatus having many coils and magnets.

In this unit, many magnets 112 that are magnetic field generators are arranged in matrix above a base 111, and coil holders 114 having four coils thereon respectively are supported movably above the magnets 112. A coil holder 114 is movable from a certain magnet to the next magnet within a range where magnets are arranged in a matrix format. In detail, the direction of a current supplied to a coil 113 is reversed at the timing when a coil 113 is moved by means of electromagnetic force up to the position where the magnetic field is changed, and the coil 113 is thereby moved further continuously by means of the magnetic field generated by the adjacent magnet. Therefore, the magnets 112 are arranged as shown in FIG. 15 so that the magnetic field is reversed alternately, such structure allows the coil holder 114 to move continuously in the plural magnetic fields in a two-dimensional plane and the displacement can be large.

Figure 16:
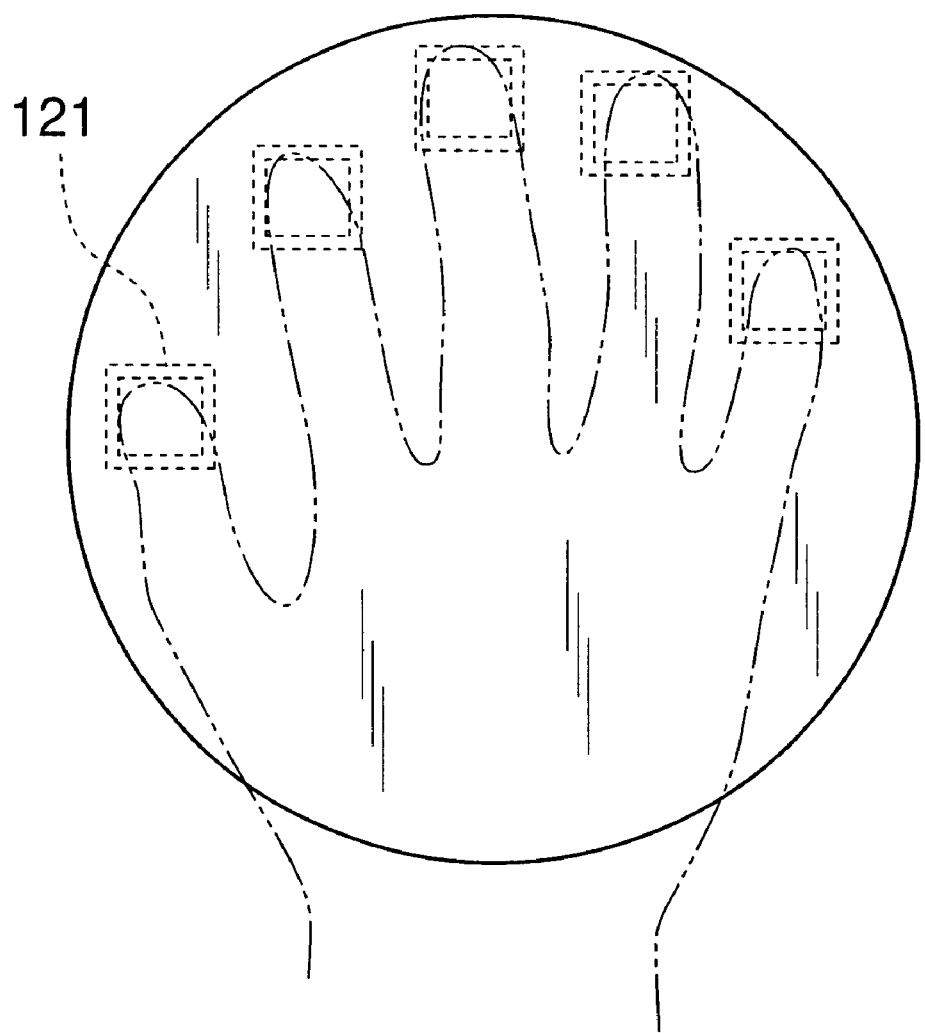
FIG. 16 is a schematic structural diagram for illustrating an information perception apparatus in accordance with another embodiment of the present invention.

FIG. 16 is a schematic structural diagram for illustrating an information perception apparatus in accordance with another embodiment of the present invention. This apparatus for perceiving information though tactile sensation of plural fingers is provided with plural perception units 121 that are described hereinbefore, the perception units are disposed at the positions where fingers are placed, and the tactile sensation information is reproduced on the fingers. As described hereinabove, plural perception units 121 are disposed, perception units are driven from a finger to another finger with delay to present the information, and as the result the tactile sensation that an object passes under the fingers is regenerated. The tactile sensation is presented to the whole fingers with one tactile information, and in other words more information is transmitted.

Figure 17:
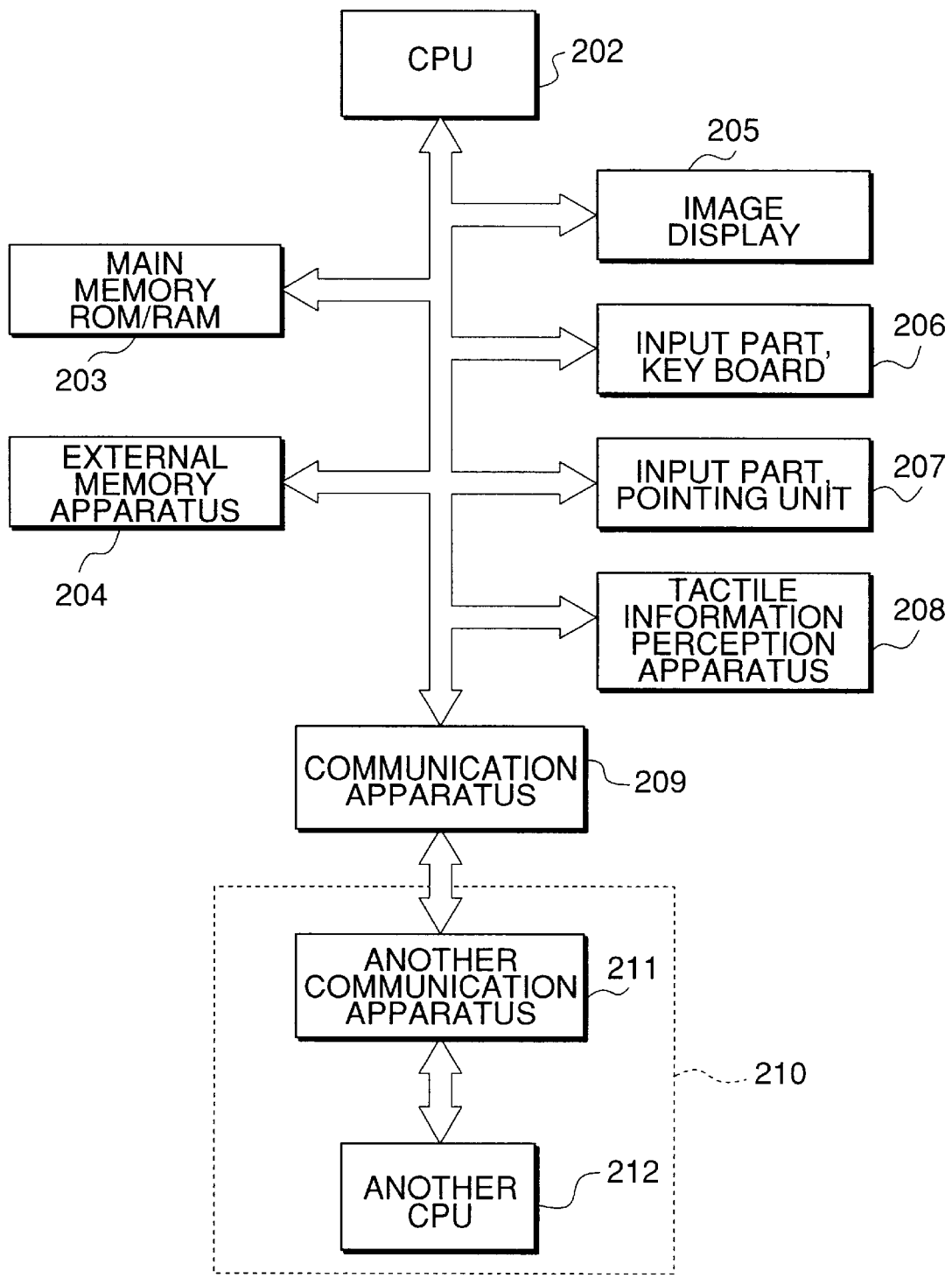
FIG. 17 is a block diagram for illustrating the schematic structure of an information transmission system in accordance with one embodiment of the present invention.

FIG. 17 is a block diagram for illustrating the schematic structure of an information transmission system in accordance with one embodiment of the present invention. An information transmission system is provided with a CPU 202 having a micro-circuit structure, a main memory 203 equivalent to a ROM that stores the fixed information such as OS and a RAM that stores the variable information, an external memory apparatus 204 including a floppy disc drive, a hard disc drive, a CD-ROM drive, and an MO drive, an image display 205 for displaying an image such as a CRT or a liquid crystal, a key board 206 that is an input part, a mouse, a touch pad (called otherwise as finger pad), a pointing part 207 for moving a pointer such as track ball, an information perception apparatus 208 having a perception unit 253, and a communication apparatus 209 for communicating with the external by way of a network, and these components are connected mutually by way of a bus. This system has the structure that is capable of communicating with another information transmission system 210 having another communication apparatus 211 and a CPU 212.

Figure 18A:
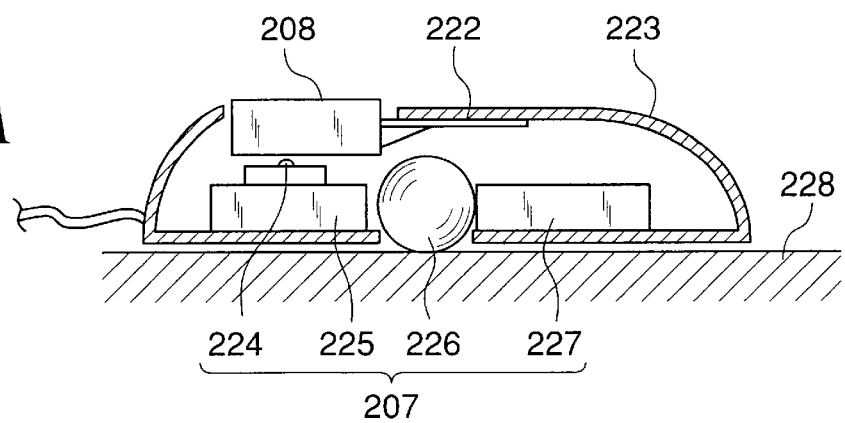
FIG. 18A to FIG. 18D are schematic structural diagrams for illustrating a perception operation unit used in the information transmission system shown in FIG. 17.
Figure 18B:
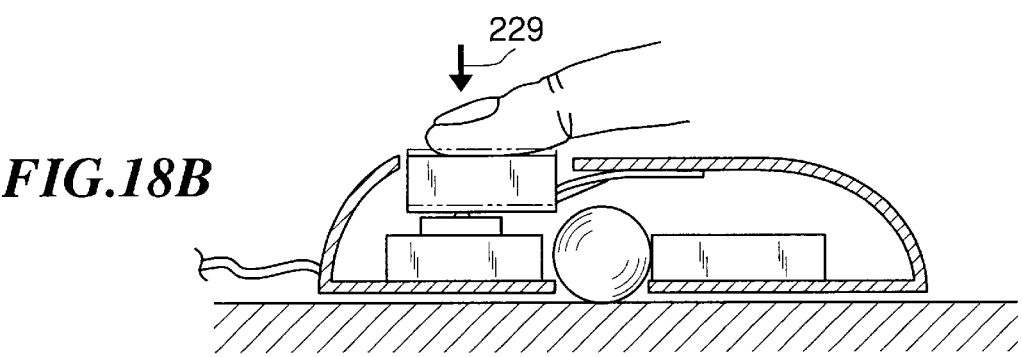
Figure 18C:
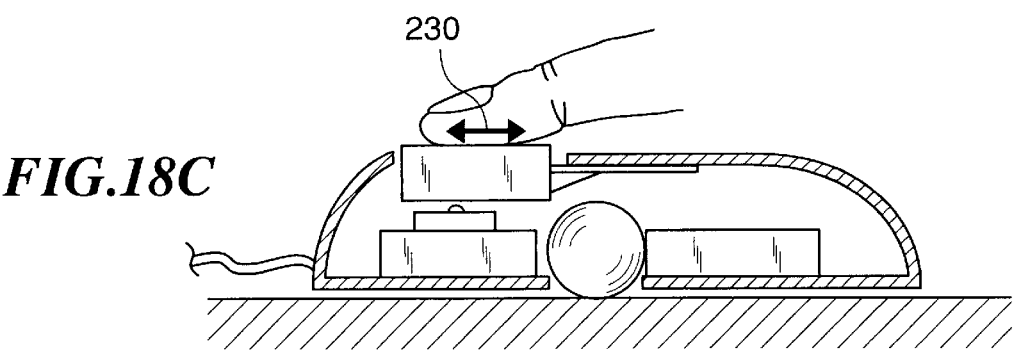
Figure 18D:
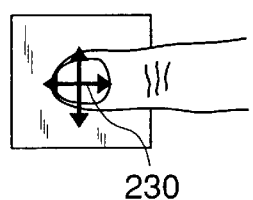

FIG. 18A to FIG. 18C shows a schematic cross sectional view of an embodiment of an information perception apparatus used for the abovementioned information transmission system and a perception operation unit provided with a pointing part for moving a pointer on a display screen.

FIG. 18A shows the status before operation, an information perception apparatus 208 is supported by a supporting member 222 fixed to a holder 223 so as to be deflectable elastically. An input operation switch 224 and a signal processing circuit 225 are disposed on the bottom of the information perception apparatus 208, the input operation switch 224 is turned on/off by pressing the information perception apparatus 208 in the direction of the arrow 229 as shown in FIG. 18B to send out the signal to the CPU side. In other words, the input operation switch 224 functions as a click button. A detection part 226 for detecting the coordinate information is provided rotatably on the base plane 228 such as a desk or mouse pad, and the rotation information is sent out to the CPU side by way of a processing circuit 227. As the result, a pointer on the display screen is moved.

As described hereinabove, the pointing part 207 shown in FIG. 17 is including the input operation switch 224, the signal processing circuit 225, the detection device 226, and the processing circuit 227. In the present example, a contact rotation type coordinate input mechanism is shown, but a non-contact type optical mouse may be used that has a detection part for non-contact detection with the base plane and that detects optically light and shade on the base plane to determine the displacement magnitude.

FIG. 18C shows the status in which a user perceives tactile stimulation corresponding to an object on the finger. The simulative tactile stimulation ranging from slow motion to high frequency vibration depending on the motion of an object is given in in-plane direction of the plane on which a finger is in contact namely the direction of the arrow 230. The input operation may be performed as shown in FIG. 18B while this status is being maintained.

Figure 19:
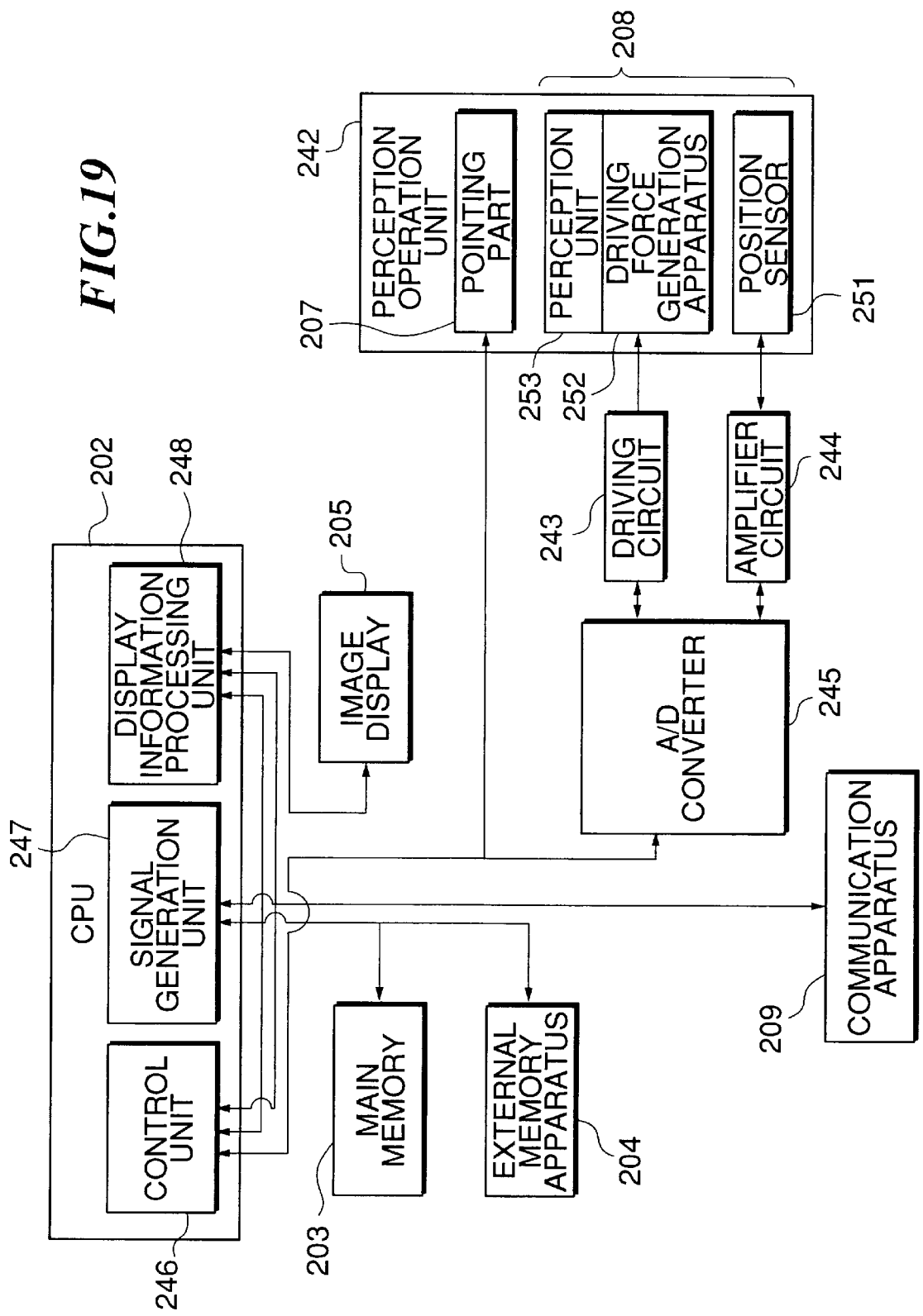
FIG. 19 is a block diagram for illustrating the detailed structure and the signal flow of the information transmission system shown in FIG. 17.

FIG. 19 is a block diagram for illustrating the signal flow in the above information transmission system. The signal flow is described with reference to FIG. 19.

In this information transmission system, a display information processing unit 248 is provided in the CPU 202. A signal generation unit 247 that generates predetermined tactile information successively is set by means of the display information supplied from the display information processing unit 248, the boundary information such as diagram frame, layout frame, or window boundary of a display area, and the coordinate information supplied from a pointing unit 207. A control unit 246 is provided for operating the displacement magnitude and vibration frequency used to drive the information perception apparatus 208 provided with a driving force generation apparatus 252 and the perception unit 253 or the control gain to generate the driving signal. The signal is changed from the digital information to the analogue voltage information by means of an A/D converter 245, and a driving circuit 243 drives the driving force generation apparatus 252. At that time, the displacement of the perception unit 253 for presenting tactile information is detected by a position sensor 251 and fed back to the control unit 246 to operate the feedback control.

The coordinate information obtained from the pointing part 207 is supplied to the CPU 202 as the display information, and displayed on an image display 205 in the form of a pointer.

The display information processed in this system is also supplied from an external computer by way of the communication apparatus 209 as shown in FIG. 19. The information that is perused or obtained on the Internet is also included in the object to be displayed in this system. Of course, the contents information that is distributed in the form of CD-ROM is also supplied by use of the external memory device 204.

Figure 20A:
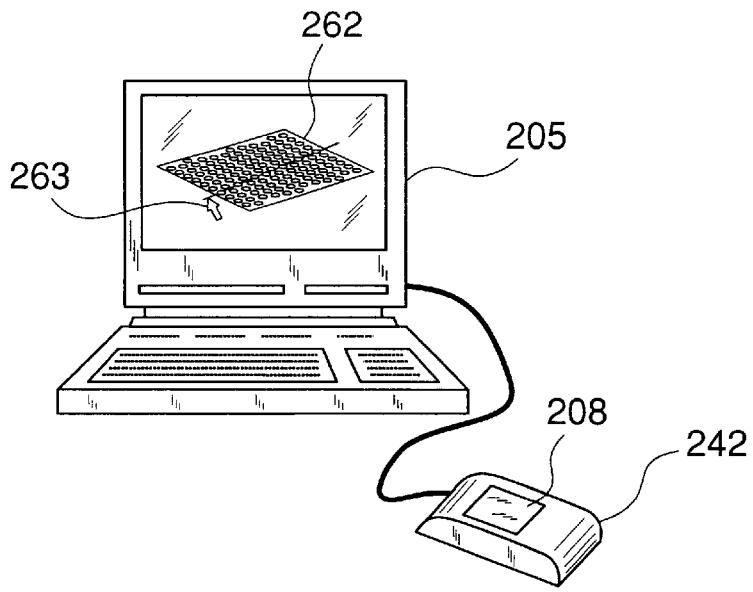
FIG. 20A to FIG. 20C are schematic diagrams for illustrating an exemplary use of the information transmission system shown in FIG. 17.
Figure 20B:
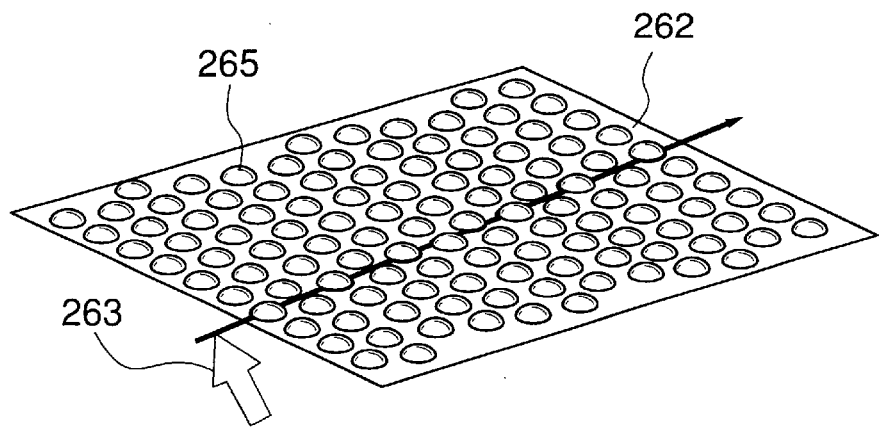
Figure 20C:
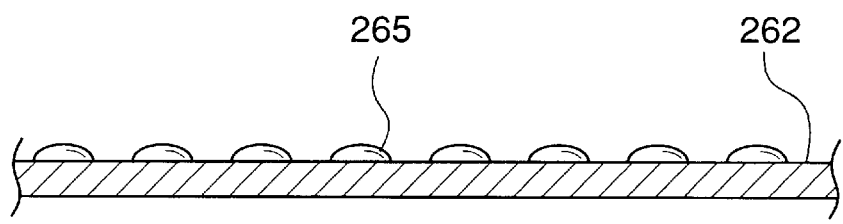

FIG. 20A to FIG. 20C are schematic diagram for illustrating an exemplary use of the above information transmission system with tactical sensation. As shown in FIG. 20A, this system is used to obtain the tactile information of an object 262 that is displayed on an image display 205 of a computer in the form of an image by use of a perception operation unit 242 provided with an tactile information perception apparatus 208. The movement magnitude of the perception operation unit 242 is detected in the same manner as used for detection of movement magnitude by means of a known mouse, and the movement magnitude is displayed as the movement magnitude of the pointer 263 on the display 205. The pointer 263 scans or traces on the object information and the tactile information perception apparatus 208 is synchronously driven, and the rough/smooth feeling or projection/recession feeling of the object 262 is reproduced by means of motion of the perception unit. The object 262 is not limited to an object having featured surface, but the pattern such as characters and symbols is recognized by means of the tactile information perception apparatus 208 through tracing tactile perception by conducting a fingertip.

FIG. 20B shows an example for reproducing the tactile information of an object displayed on an image display 205, and in this case a material having many fine projections 265 on the surface is supposed as the object 262. FIG. 20C shows a partial cross sectional view of the object. When the reproduction surface is traced with a pointer, every time the pointer 263 reaches a projection 265, the pointer 263 and the perception unit move so as to detour around the projection 265. Alternatively, some resistance feeling is given as if the pointer 263 and the perception unit move over the projections 265 with some resistance. The delicate detour motion or climbing motion of the fingertip can be recognized through the motion of the tactile information perception apparatus 208.

Figure 21:
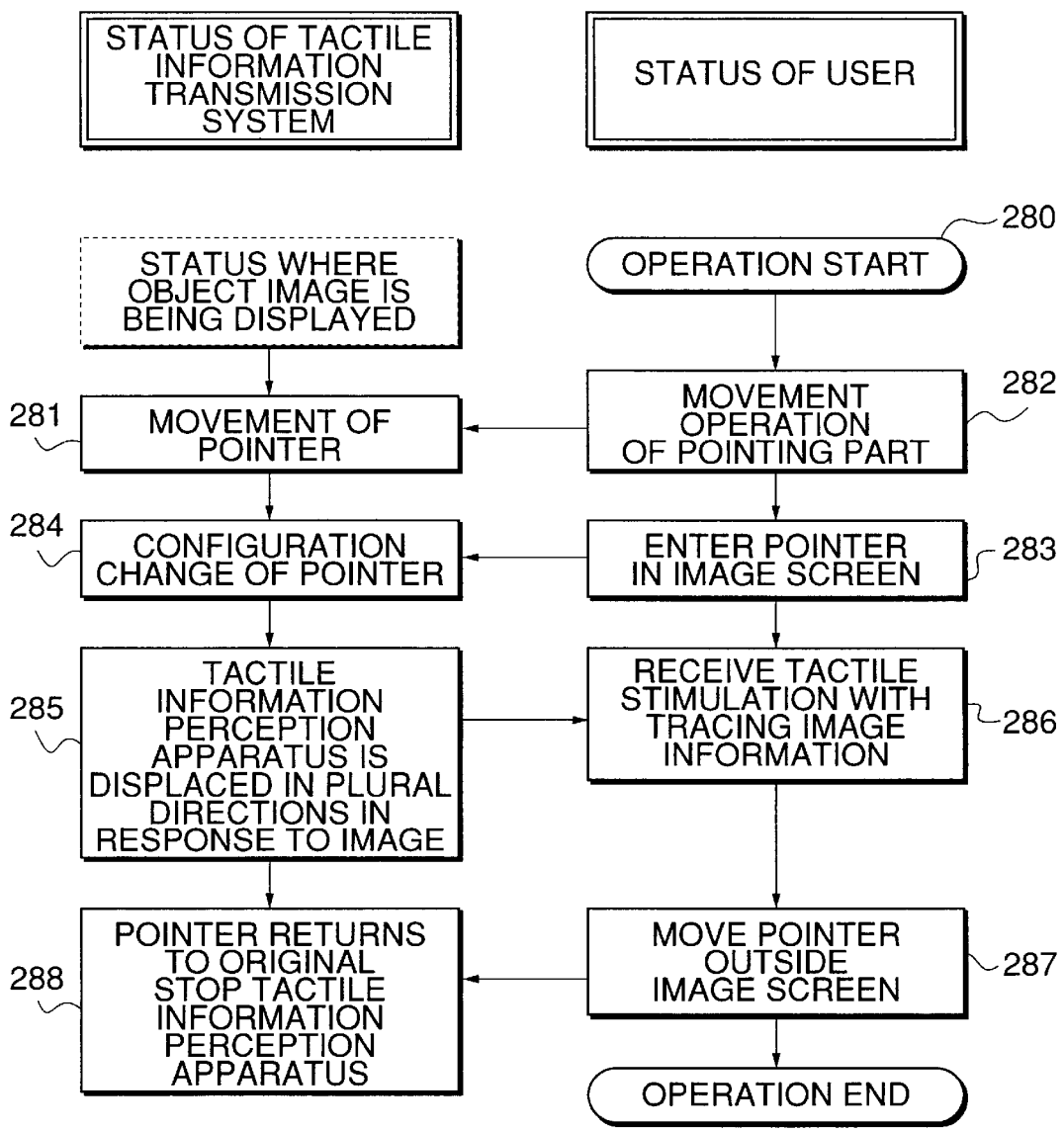
FIG. 21 is a flowchart for describing the operation of the information transmission system shown in FIG. 20.

FIG. 21 is a flowchart for describing the operation procedures with use of the above information transmission system. In this system, an example in which a user who holds the perception operation unit 242 moves the pointer on the object 262 displayed on the image display 205 is described. The right side in FIG. 21 shows the flow of the user operation, and the left side shows the status of the information transmission system.

"Operation start" 280 is the step in which the user holds the perception operation unit 242 to start the operation. "movement of pointer" 281 is the step in which the user moves the pointer that will be used to display the position on the screen in movement operation of pointing unit (282) to the image part to be used, and at this time point the perception unit 253 of the information transmission system is not moved.

In the step "enter pointer in image screen" 283, the computer recognizes that the pointer position enters to a specified inter discipline based on the position coordinate of the pointer, and the sequence enters to the status of "configuration change of pointer" 284. In this step, the configuration of the pointer is changed from the ordinary mark (for example, arrow) to another mark (for example, hand shaped) so that the user can recognize visually that the pointer enters to the area where the CPU side gives the tactile stimulation.

Simultaneously, the sequence enters into the status "tactile information perception apparatus is displaced in plural directions in response to image" 285 and the driving vibration and displacement are given to the perception unit 253 correspondingly to the projection/recession image of the object. This driving status continues during movement of the pointer in the corresponding image area. At that time the user can receive the tactile information while the user is tracing the image information with the pointer (286). When the user moves the pointing part in the screen outside the image area (287), the presentation of the tactile sensation stimulation is discontinued (288).

With an information processing apparatus located remotely connected to this information processing apparatus by way of the communication apparatus, it is possible that the same tactile information is presented at plural places, or that the motion of the information perception apparatus is transmitted remotely by means of the communication apparatus and a user obtains the tactile information of the object at a place distant far from the object.

The power source for driving the perception unit may be supplied from the connected computer side, or it is desirable that a built-in power source such as a battery is incorporated in the case of wireless connection.

Figure 22:
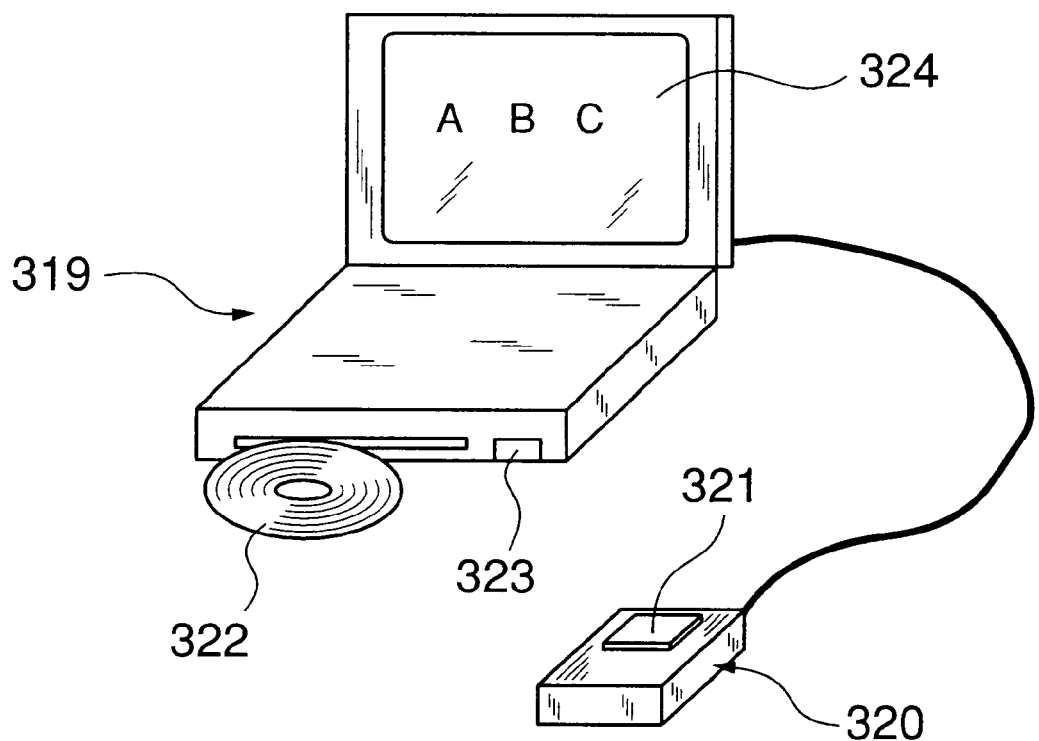
FIG. 22 is a schematic structural diagram for illustrating another example of an information transmission system in accordance with the present invention.

FIG. 22 illustrates another example of an information transmission system in accordance with the present invention, which has applications different from rough/smooth feeling and soft-hard feeling of object information. In other words, character information and symbol/sign information is transmitted by use of an information perception apparatus.

In this information transmission system, a perception operation unit 320 is connected to an information processing unit 319, and a CD-ROM drive, which is an external memory apparatus, is incorporated in the information processing unit as a memory part. The contact force perception information signal is read from a CD-ROM 322 into the main memory unit of the information processing apparatus 319. A finger is placed on a perception unit 321 on which a finger is to be placed provided on the outside portion of the perception operation unit 320 and a presentation starting button 323 is turned ON, and then the perception unit 321 is operated based on the predetermined positional data and moving time and the information 324 to be presented is transmitted to the finger of the user by way of motion. The user can recognize the character or sign that is set previously so as to correspond to tactile stimulation through the time-series tactile information reproduced on the finger. The user can repeat the operation as desired.

In this case, the CD-ROM is not necessarily used as the memory part, a magnetic disc, smart medium, magnetic card, or barcode, which is to be read from memory code printed on paper or card, may be used.

In the present example, it is possible that the perception unit is operated without the display and it is possible that various information is recognized without visual information, in addition to the output of both tactile information and visual information on the display.

Furthermore, it is possible that the contact force perception information signal is obtained from a remote location, and two users located on remote places respectively can communicate the contact force perception information transmitted by each other. In this case, this information transmission system is served also as an input part for transmitting tactile information namely input part of motion information of a finger, for example, a user A moves the perception unit with a finger of the user A and transmits the motion information, and a user B receives the motion with a finger of the user B at the separate place.

Figure 23A:
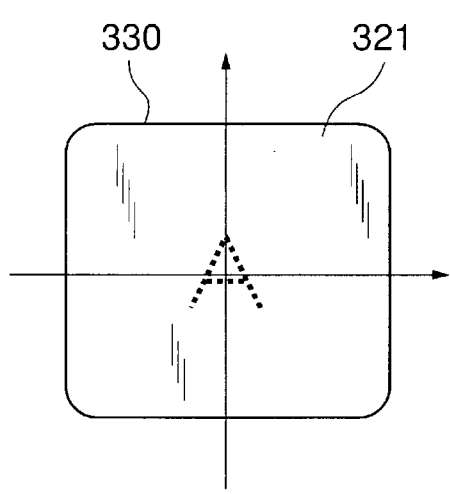
FIG. 23A to FIG. 23C are schematic diagrams for illustrating the function of the information transmission system shown in FIG. 22.
Figure 23B:
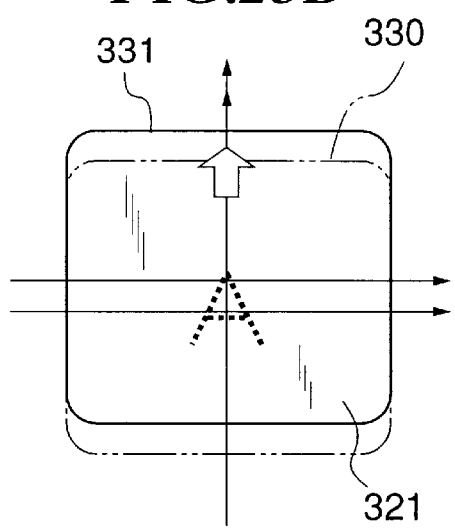
Figure 23C:
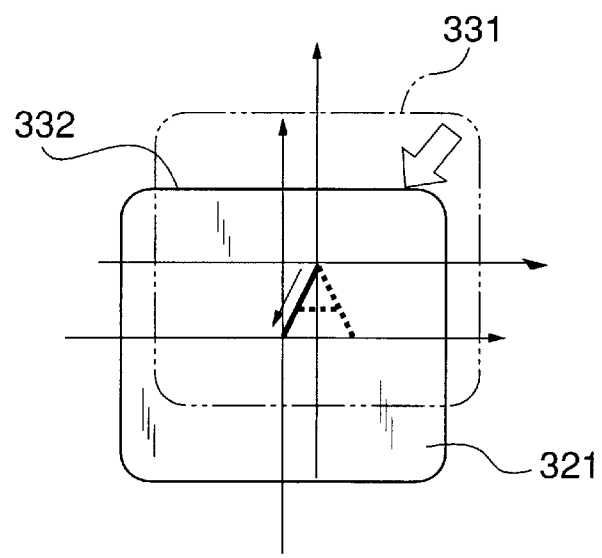

FIG. 23A to FIG. 23C are partially enlarged views for describing the operation of the information transmission system shown in FIG. 22, and describe an exemplary operation in the case that an alphabet character "A" is recognized with a fingertip. FIG. 23A shows that the perception unit 321 is located at the home position 330 before starting to write "A". First, as shown in FIG. 23B, the perception unit is moved to the position 331 so that the vertex of "A" is coincident with the reference point, and as shown in FIG. 23C the perception unit is moved to the position 332 so as to trace on the left slant line. After such tracing operation is finished as described hereinabove, the perception unit is returned to the home position, the operation for obtaining the next information is started. At that time, the motion is categorized into two types of motion, namely the motion for tracing the line of the character and the motion for jumping from a line to another line. To discriminate these two types of motion, the motion speed is varied depending on the motion type, or vibration is overlapped to change the tactile stimulation when the line of the character is traced.

Figure 24:
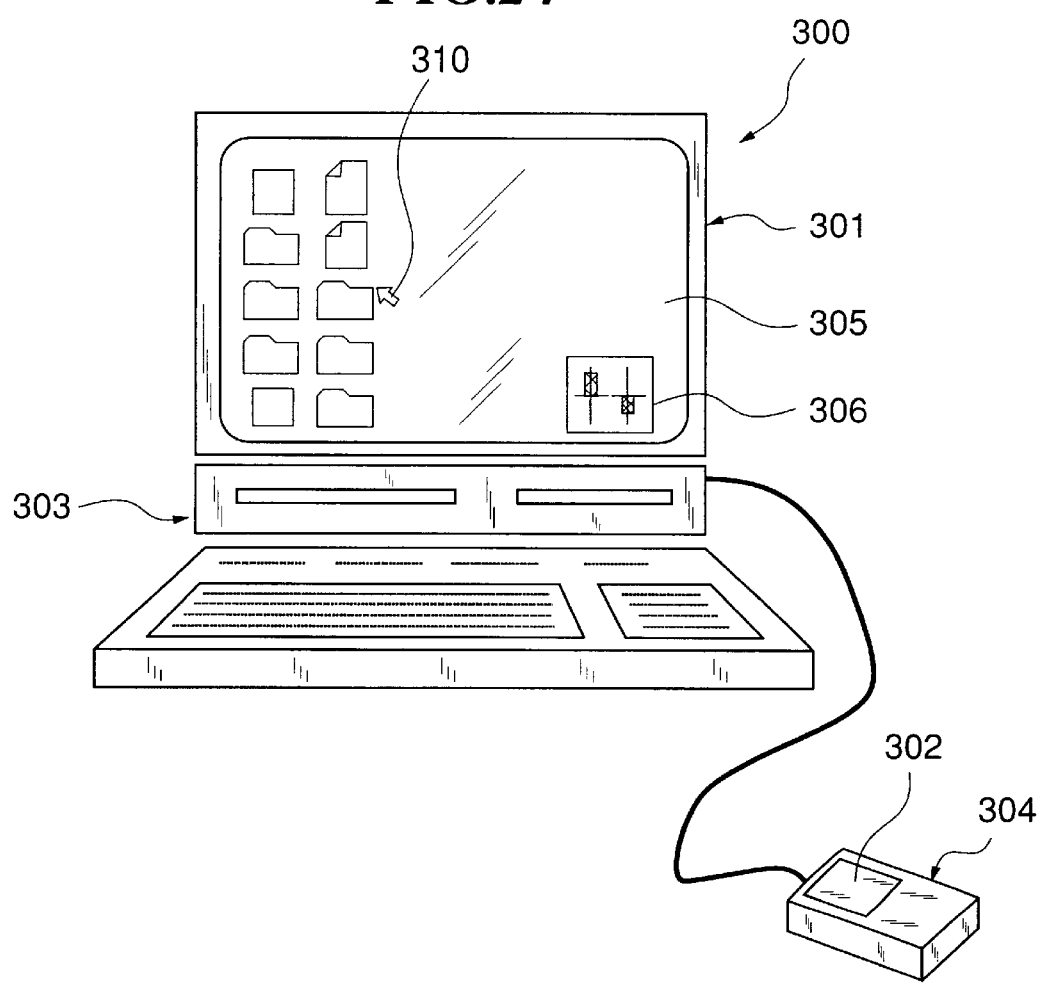
FIG. 24 is a schematic structural diagram for illustrating another example of an information transmission system in accordance with the present invention.

FIG. 24 illustrates another embodiment in accordance with the present invention. This information transmission system 300 is provided with a display 301 served as a display part, an information perception apparatus 302, and a personal computer body 303, and the display 301 and the information perception apparatus 302 are connected to the computer body 303. The information perception apparatus 302 is structured in a piece together with a mouse part 304 that is served as a pointing part. The information transmission system presents the contact force perception stimulation to the information perception apparatus, and displays the contact force perception stimulation on a graphic user interface screen 305 (referred simply to as GUI hereinafter) as the visual information.

This information transmission system is operated as described hereunder.

When a cursor 310 is placed in the GUI screen and is overlapped on an image information (in this case, an icon), the contact force perception signal is converted to a driving signal based on the relation between the image information and the cursor coordinate and the information perception apparatus 302 drives the motion equivalent to pseudo-tactile sensation so that the overlapping is recognized through tactile sensation.

In this case, the pseudo-rough/smooth feeling for climbing over the icon is provided to the fingertip as if the icon has the thickness in the vertical direction. It is also possible that the icon is provided with the inertia feeling and the inertia feeling magnitude may be varied depending on the size of the file capacity in the case that the icon is clicked and moved to another place.

Simultaneously, the generated tactile stimulation can be expressed visually in the form of displacement magnitude, speed, or acceleration or functions of these values on the display 301 by providing a status indication part 306.

Figure 25:
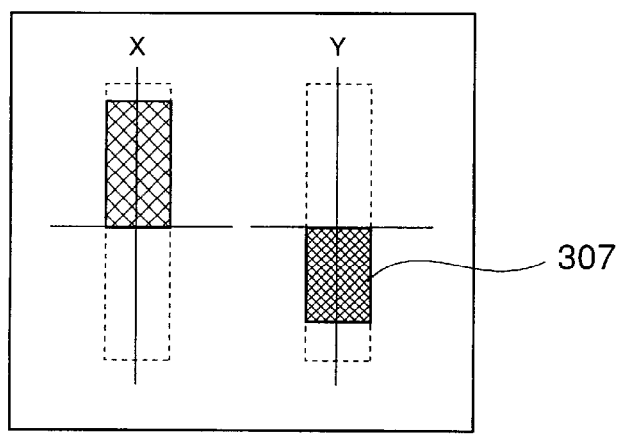
FIG. 25 is a schematic diagram for illustrating a status indication part of the contact force perception apparatus shown in FIG. 24.

FIG. 25 is an enlarged view of the status indication part 306 shown in FIG. 24, the magnitude equivalent to the imaginal icon height is displayed in the form of a bar graph so that the length of the bar 307 is variable with time.

Figure 26:
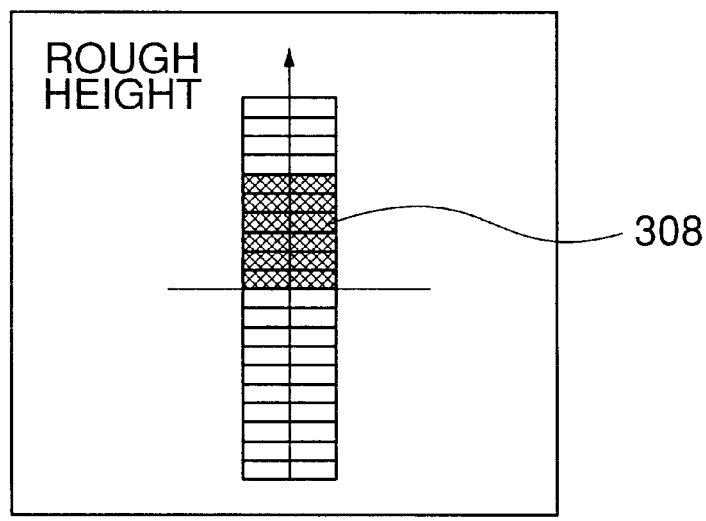
FIG. 26 is a schematic diagram for illustrating another example of a status indication part.

FIG. 26 illustrates another example of a status indication part. In the case that an image for supplying the tactile stimulation has the imaginal height information, the imaginal rough height is expressed in the form of a bar graph 308.

Figure 27:
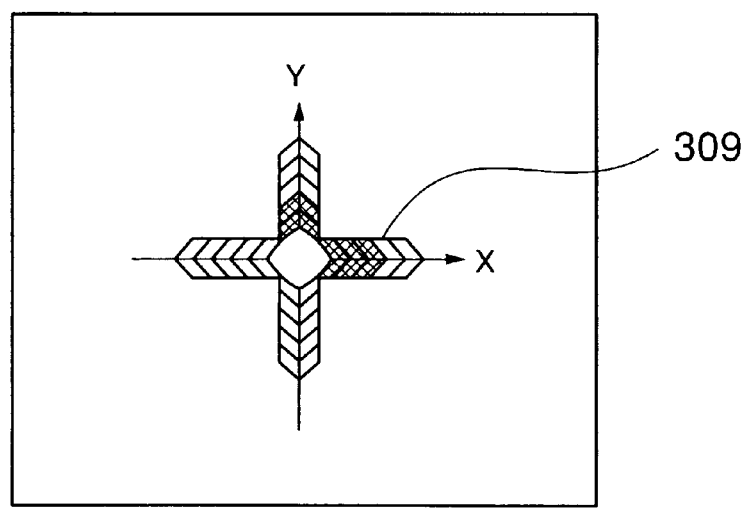
FIG. 27 is a schematic diagram for illustrating another example of a status indication part.

FIG. 27 illustrates another example of a status indication part. In this case, the driving force generated by the information perception apparatus is expressed in the form of arrow 309, the color of the arrow is changed depending on the increase/decrease of the force in x-direction and y-direction. When the cursor is located on the area where there is no relation to the object to be displayed for contact force perception on the displayed screen, the arrow on the status indication part does not change.

Figure 28:
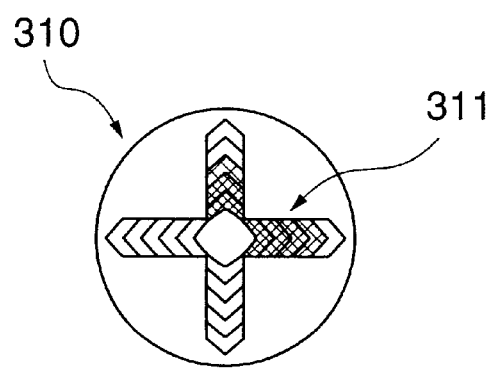
FIG. 28 is a schematic diagram for illustrating an example in which a status indication part is provided on pointer part.

FIG. 28 is an enlarged view of the pointer (cursor) in another example. This pointer is the cursor 310 shown in FIG. 24 to which the status indication part 311 is added, and the reaction force to be perceived is expressed as the color change of the surrounding arrow when the center of the pointer approaches, overlaps, or crosses the object having the tactile information.

Next, the display method of the arrow shown in FIG. 28 is described.

Figure 29:
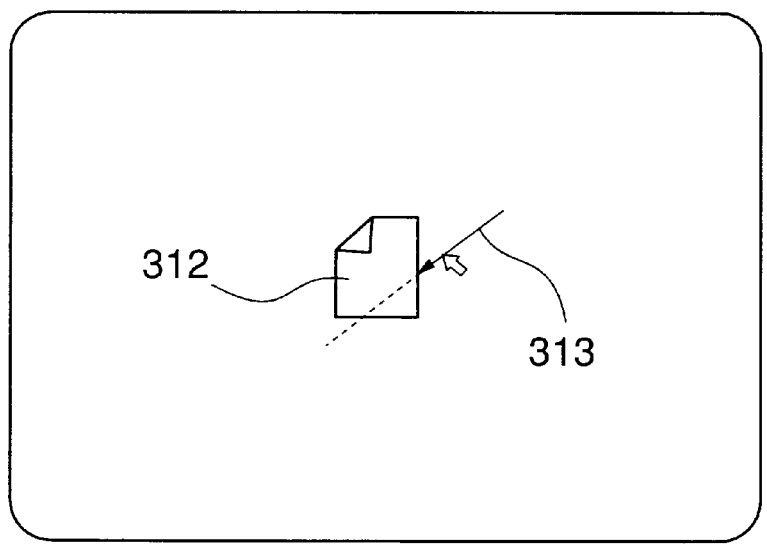
FIG. 29 is a schematic structural diagram for illustrating a display method on a status indication part.

FIG. 29 shows the change of the arrow shown in FIG. 28. In FIG. 29, the case where the pointer moves from the upper right 313 and overlaps on the displayed object 312 is described. In this case, because the tactile stimulation in the horizontal direction of the screen is synthesized with the tactile stimulation in the vertical direction of the screen, both arrows in the horizontal direction and the vertical direction are colored as shown in FIG. 28. The direction of four arrows shows plus/minus direction of each axis.

Figure 30:
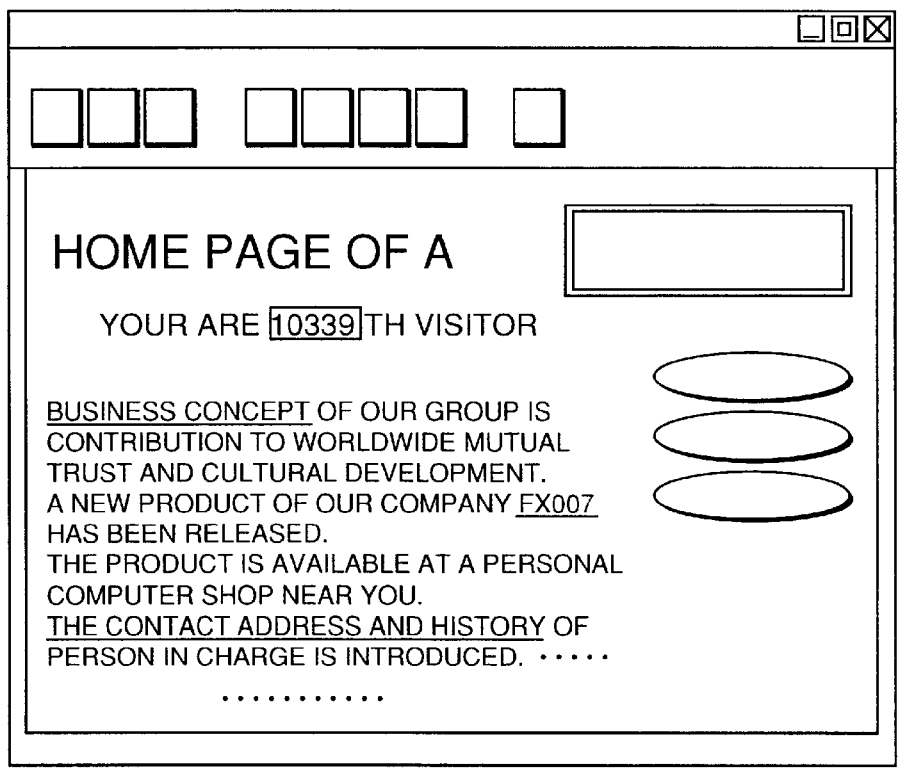
FIG. 30 illustrates an exemplary Internet homepage displayed on a display of an information transmission system in accordance with the present invention.

FIG. 30 illustrates tactical presentation related to an Internet homepage of an information transmission system in accordance with the present invention. On the Internet, the hyper link (also referred to simply link) is set to the related document or related URL by use of hyper text usually. The list shown in FIG. 30 is an HTML (Hyper Text Markup Language) document.

On recent homepages, the large quantity of text and image information is loaded, and many links are created. In the case where much text is loaded densely (particularly, English page is written with a small character font in many cases), reading of such document with moving line of sight causes serious eyestrain and stress. Particularly, when whether there is a link in the specified word or image or not is checked, the line of sight should be concentrated because a link is recognized only by changing of cursor configuration.

In the present example, the problem of the conventional art is solved, when a cursor comes on a word where there is a link (underlined for convenience) in FIG. 30, the tactile stimulation is given to the information perception apparatus.

Figure 31:
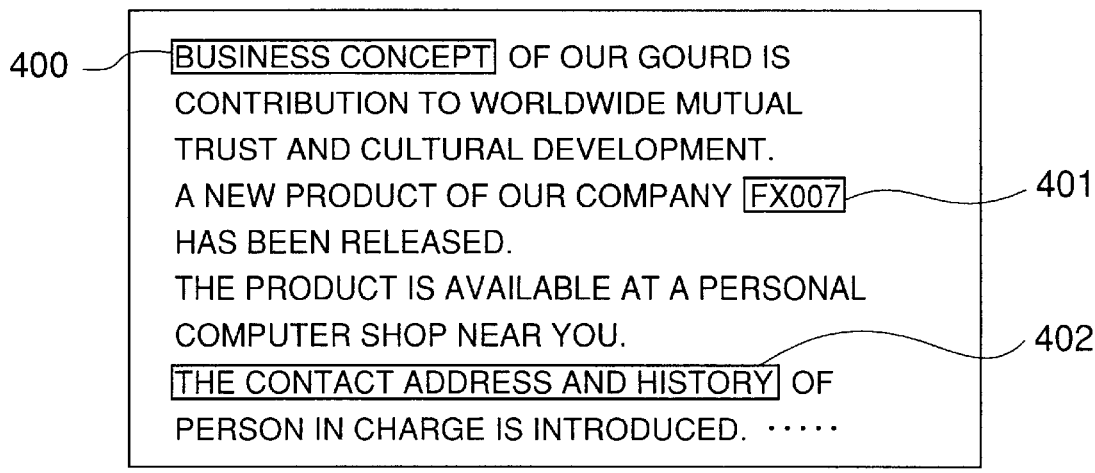
FIG. 31 shows a tactile information presentation area of the Internet homepage shown in FIG. 30.

FIG. 31 shows an area for causing tactical stimulation in the example of FIG. 30. The information perception apparatus gives the tactile stimulation when the cursor enters into the presenting areas (400), (401), and (402) of words where the links are provided. The previous differentiation between the tactile stimulation motion for linking to the product information (401) and the tactile stimulation motion for linking to the personal information and contact address (402) allows us to discriminate various information with a finger.

Furthermore it is possible that a user recognizes the existing range of the link information clearly by changing the movement magnitude or the motion speed of the perception unit of the information perception apparatus when the cursor approaches, for example, the boundary of the range and is very near going out from the range that surrounds the word. As the result, the recognition efficiency is improved, and the present example is considered to be an interface that is friendly to users and helpful to reduce the stress because the recognition does not depends only on visual sensation.

As described hereinbefore, in the information perception apparatus of the present invention, the driving force generation unit conducts the hand or finger to move in the direction, and presents the tactile information to the fingertip, which is the typical perception organ. Therefore, the present invention exhibits the effect that the information is acquired passively by placing a finger in comparison with the conventional art in which a finger is moved actively.

Because the tactile sensation is given to the fingertip that is very sensitive, the user can perceive strong tactile sensation though the motion is small, on the other hand, because the small motion is sufficient for perception, the high frequency vibration can displace the perception unit, and various expressions is realized.

The combination of the magnetic field generation part and coil is used as the driving mechanism of the perception unit, as the result the small-sized and thin information perception apparatus can be realized though such apparatus cannot be realized by use of the conventional combination of the rotation type motor and arm-type transmission mechanism because of the large size, and it becomes possible to present the tactile sensation to the fingertip.

As the result, it is possible to add the information perception apparatus in accordance with the present invention to buttons and switches used conventionally as a new function, and the information input/output apparatus having a new effect namely two-way transmission that has not been known is realized.

It is possible that the information transmission system of the present invention presents the two-dimensional tactile stimulation to the display information of a wide area displayed on the image display though the information perception apparatus having a small area on which a fingertip is placed is used. The tactile information equivalent to convex/concave feeling and rough/smooth feeling can be given to the fingertip as the reaction force stimulation by displacing desirably the fingertip two-dimensionally. As the result, by combining slow tracing motion and high frequency vibration, differently from conventional simple vibration, various tactile information sensations are reproduced more correctly.

The information perception apparatus and input part are provided in the same perception operation unit, it is therefore possible that a user performs two-way operation without replacing the finger. By connecting the communication apparatus, the information perception apparatus is operated by means of tactile sensation based on the information transmitted from the remote place, and users located on places distant far each other can transmit the tactile information mutually.

What is claimed is:

1. An information perception apparatus for receiving high tactile sensitivity of a fingertip of a user, comprising:
   a perception unit on which the fingertip is to be placed supported movably in an approximately parallel direction to a contact plane of the fingertip;
   a signal input unit that receives a motion signal including information which indicates a displacement direction of the perception unit;
   a driving unit that moves the perception unit correspondingly to the motion signal supplied to the signal input unit, wherein the perception unit is supported slidably with respect to the base held by a hand that contains the fingertip placed on the perception unit;
   a displacement detection unit that detects the relative slidable displacement between a base and the perception unit based on an operation of the displacement of a portion linked to the displacement of the perception unit; and
   a signal output unit that sends out displacement information acquired by the displacement detection unit so that users can perceive the tactile sensation remotely.

2. The information perception apparatus as claimed in claim 1, wherein the driving unit is provided with a signal conversion part that converts the motion signal supplied to the signal input unit to a driving signal that controls driving operation of the driving unit and a driving force generation part that receives the driving signal and provides a force to the perception unit to move correspondingly to the driving signal.

3. The information perception apparatus as claimed in claim 1, wherein the driving unit provides a driving force so that the perception unit moves a predetermined displacement magnitude or speeds up to a predetermined motion speed, or so that the displacement, motion speed, or motion acceleration changes as predetermined over time.

4. The information perception apparatus as claimed in claim 1, wherein the signal input unit is connected to a separable unit through a wire, and at least the motion signal is supplied from the separable unit.

5. The information perception apparatus as claimed in claim 1, wherein the signal input unit is wirelessly connected to a separable unit, and at least the motion signal is supplied from the separable unit.

6. The information perception apparatus as claimed in claim 1, further comprising:
   a position information input part that acquires position information in response to an operation of a user; and
   a signal output unit that outputs the position information to an external apparatus.

7. An information transmission system comprising
   the information perception apparatus as claimed in claim 6; and
   an information processing apparatus that receives the position information supplied from the information perception apparatus and sends out the motion signal corresponding to the input position information to the information perception apparatus.

8. A recording medium that is computer-readable and in which a program is recorded, wherein the program is used for commanding an external apparatus to execute a process to control the operation of the information perception apparatus as claimed in claim 6, the process comprising the steps of:
   acquiring the position information acquired by the position information input part and sent out from the signal output unit;
   determining the motion signal of the information perception apparatus corresponding to the acquired position information by use of information correlated to the position stored previously; and
   sending out the motion signal to the signal input unit of the information perception apparatus.

9. The information transmission system as claimed in claim 7, further comprising:
   a display apparatus that displays information showing a previously set position based on indication of information generated from the information processing apparatus, wherein
   the information processing apparatus controls a pointer to be displayed at a position corresponding to the position shown by the information on the display screen of the display apparatus and sends out the motion signal correspondingly to the relation between the display position of the pointer and the display position previously set in the information.

10. The information transmission system as claimed in claim 7, wherein the information processing apparatus receives the motion signal to be supplied to the information perception apparatus through a network from another information providing apparatus connected to the network.

11. The information transmission system as claimed in claim 9, wherein the information processing apparatus receives the information displayed on the display apparatus in correlation to the motion signal through a network from a information providing apparatus connected to the network.

12. The information transmission system as claimed in claim 9, wherein the information processing apparatus controls the display apparatus to display a visual display corresponding to the displacement magnitude, speed, or acceleration of the perception unit driven by means of the motion signal.

13. The information perception apparatus as claimed in claim 1, wherein the base is supported movably on and along a flat plane, and wherein the information perception apparatus further comprises
   a position information input part that acquires position information based on a movement magnitude of the base along the flat plane when a user moves the base, and
   a signal output unit that outputs the position information to an external apparatus.

14. The information perception apparatus as claimed in claim 1, wherein the driving unit moves the perception unit at least in a direction in which the fingertip presses down the perception unit and in a direction perpendicular thereto to shake the fingertip.

15. The information perception apparatus as claimed in claim 14, wherein the displacement magnitude in the fingertip shaking direction and fingertip pressing down direction is not more than 3 cm.

16. The information perception apparatus as claimed in claim 1, wherein the driving unit comprises:
   a magnetic field generation part that generates a magnetic flux in a Z-axis direction among X-axis, Y-axis, and Z-axis directions orthogonal to each other;
   a first coil group including at least one coil disposed so that part of winding crosses the magnetic flux generated by the magnetic field generation part in X-axis direction; and
   a second coil group including at least one coil disposed so that part of winding crosses the magnetic flux generated by the magnetic field generation part in Y-axis direction, and wherein
      a driving current corresponding to the motion signal is supplied to the first coil group and the second coil group, and
      the perception unit is connected to the first coil group and the second coil group so as to be displaced based on the displacement of the first coil group and the second coil group, caused by the supply of the driving current.

17. The information perception apparatus as claimed in claim 16, wherein the coils included in the first coil group and the coil included in the second coil group cross the magnetic flux generated by the common magnetic field generation part.

18. The information perception apparatus of claim 16, wherein the magnetic field generation part comprises a single magnet which supplies a magnetic field to the first and second coil group.

19. An information transmission system comprising:
   the information perception apparatus as claimed in claim 1; and
   an information processing apparatus that generates the motion signal supplied to the information perception apparatus through the signal input unit.

20. The information transmission system as claimed in claim 19, further comprising:
   an information providing apparatus connected to the information processing apparatus through a network, comprising:
      a memory that stores predetermined information correlated to the motion signal; and
      a transmission part that transmits the predetermined information from the memory to the information processing apparatus in response to a request of the information processing apparatus.

21. The information perception apparatus of claim 1, wherein the driving unit comprises:
   a magnetic field generation part that generates a magnetic flux in a z-axis direction among X-axis, Y-axis, and Z-axis directions orthogonal to each other;
   a first coil group including at least one coil disposed so that part of the winding crosses the magnetic flux generated by the magnetic field generation part in X-axis direction;
   a second coil group including at least one coil disposed so that part of winding crosses the magnetic flux generated by the magnetic field generation part in Y-axis direction;
   a driving power source that supplies currents controlled independently to the first coil group and the second coil group; and
   a coil holder to which the first coil group and the second coil group are fixed;
   wherein the magnetic field generation part and the coil holder are supported relatively movably in the X-axis direction and Y-axis direction.

22. The driving unit as claimed in claim 21, wherein:
   at least one of the first coil group or the second coil group comprises at least two coils;
   the at least two coils of the first coil group are disposed in their coil centers being differently positioned in the X-axis direction, or the at least two coils of the second coil group are disposed with their coil centers being differently positioned in the Y-axis direction; and
   the driving power source supplies different current to two or more coils included in the first coil group or the second coil group.

23. The information perception apparatus of claim 21, wherein the magnetic field generation part comprises a single magnet which applies a magnetic field to the first and second coil groups.

* * * * *